US011451190B2

(12) United States Patent
Büchel

(10) Patent No.: US 11,451,190 B2
(45) Date of Patent: Sep. 20, 2022

(54) DEVICE FOR PHOTOVOLTAIC INSTALLATION

(71) Applicant: IWORKS AG, Ruggell (LI)

(72) Inventor: Arthur Büchel, Ruggell (LI)

(73) Assignee: iWorks AG

( * ) Notice: Subject to any disclaimer, the term of this patent is extended or adjusted under 35 U.S.C. 154(b) by 169 days.

(21) Appl. No.: 16/965,597

(22) PCT Filed: Jan. 28, 2019

(86) PCT No.: PCT/CH2019/050001
§ 371 (c)(1),
(2) Date: Jul. 28, 2020

(87) PCT Pub. No.: WO2019/144248
PCT Pub. Date: Aug. 1, 2019

(65) Prior Publication Data
US 2021/0050813 A1     Feb. 18, 2021

(30) Foreign Application Priority Data
Jan. 28, 2018    (CH) ................................ 00095/18

(51) Int. Cl.
*H01L 31/044*     (2014.01)
*H02S 30/20*     (2014.01)
*H02S 20/10*     (2014.01)
*H02S 40/32*     (2014.01)
*H02S 40/38*     (2014.01)
*B60L 53/51*     (2019.01)
*B60L 53/18*     (2019.01)
*B60L 53/30*     (2019.01)
(Continued)

(52) U.S. Cl.
CPC .............. *H02S 30/20* (2014.12); *B60L 53/18* (2019.02); *B60L 53/30* (2019.02); *B60L 53/51* (2019.02); *F21S 9/035* (2013.01); *G01W 1/10* (2013.01); *H02S 20/10* (2014.12); *H02S 40/32* (2014.12); *H02S 40/38* (2014.12)

(58) Field of Classification Search
CPC ....... H01L 31/00–078; Y02E 10/50–60; H02S 20/00–32; H02S 30/00–20; E04H 6/00–44
See application file for complete search history.

(56) References Cited

U.S. PATENT DOCUMENTS

2011/0290305 A1    12/2011   Hoffmann

FOREIGN PATENT DOCUMENTS

CH            706581       12/2013
WO       2011140557     11/2011
(Continued)

OTHER PUBLICATIONS

PCT International Search Report for WO 2019144248, dated May 16, 2019, 7 pages.

*Primary Examiner* — Bach T Dinh
(74) *Attorney, Agent, or Firm* — Morriss O'Bryant Compagni Cannon, PLLC

(57) ABSTRACT

The invention relates to a solar power installation which is characterized in that the supports of the solar modules are stacked one above the other when in the "off" state and are extended by means of a transfer and lifting mechanism when in operating mode. The installation is also equipped with a controller which allows the installation to put the system into the safe off state in adverse conditions. The system is also advantageously suitable for stored energy sources and fueling electric vehicles.

27 Claims, 20 Drawing Sheets

(51) Int. Cl.
  *F21S 9/03* (2006.01)
  *G01W 1/10* (2006.01)

(56) References Cited

FOREIGN PATENT DOCUMENTS

| WO | 2013006164 | 1/2013 |
| WO | 2014179893 | 11/2014 |
| WO | 2016049710 | 4/2016 |
| WO | 2017093540 | 6/2017 |

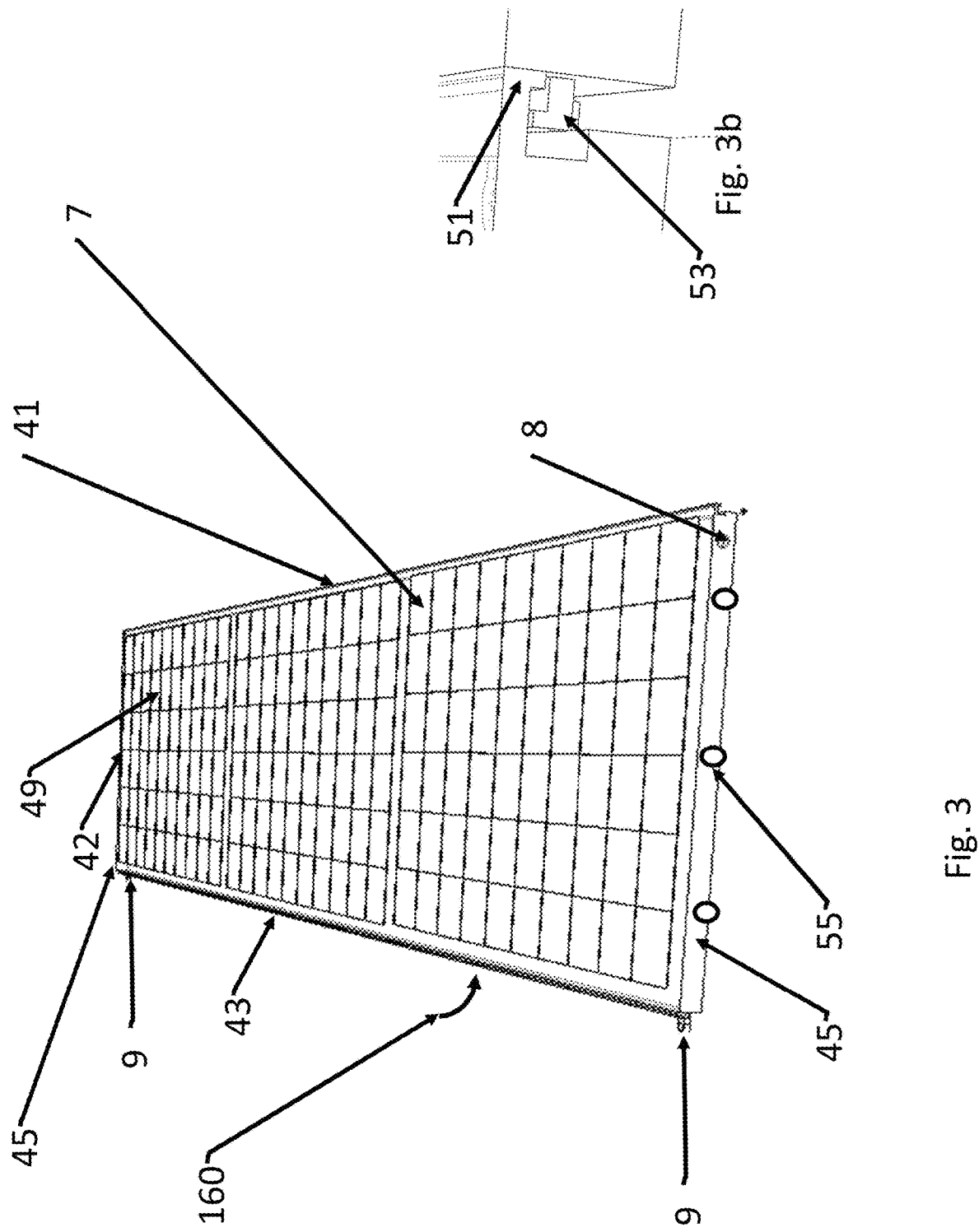

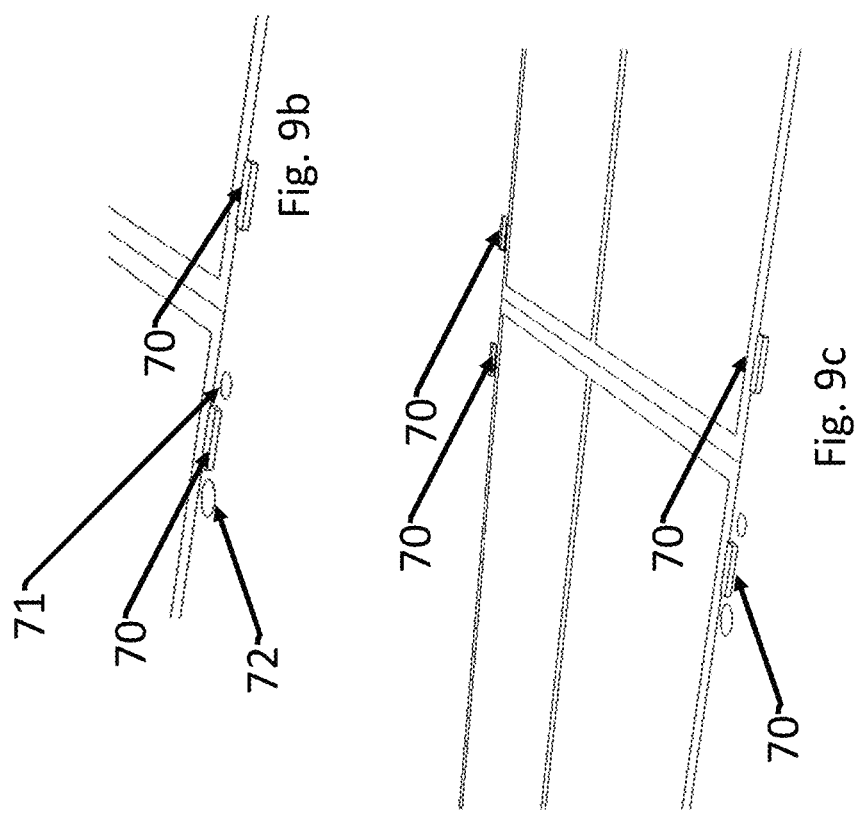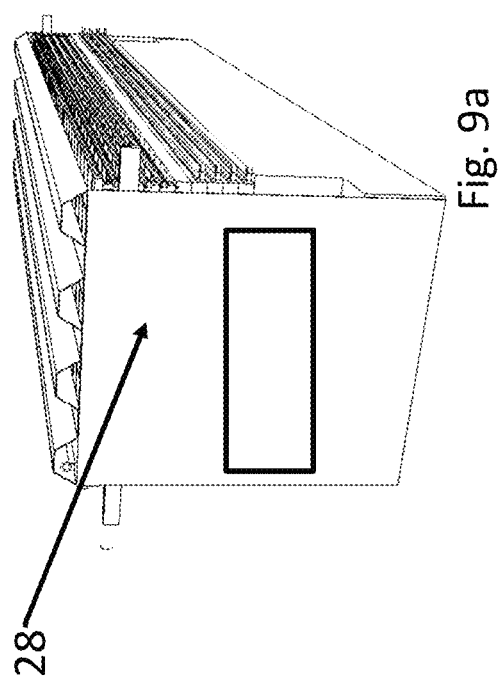

Simple and fast construction of the installation
Prefabricated box at the installation site,
"mini" foundations & power connection ready
Installation of the lateral supporting elements
Lifting the box into position
Installation of the supports
Mains connection,
In operating state
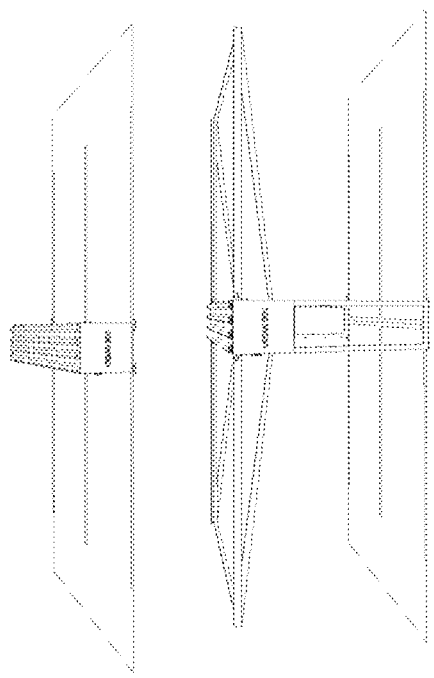
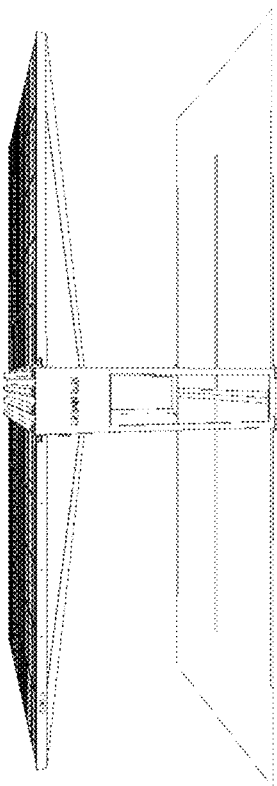
Fig. 12

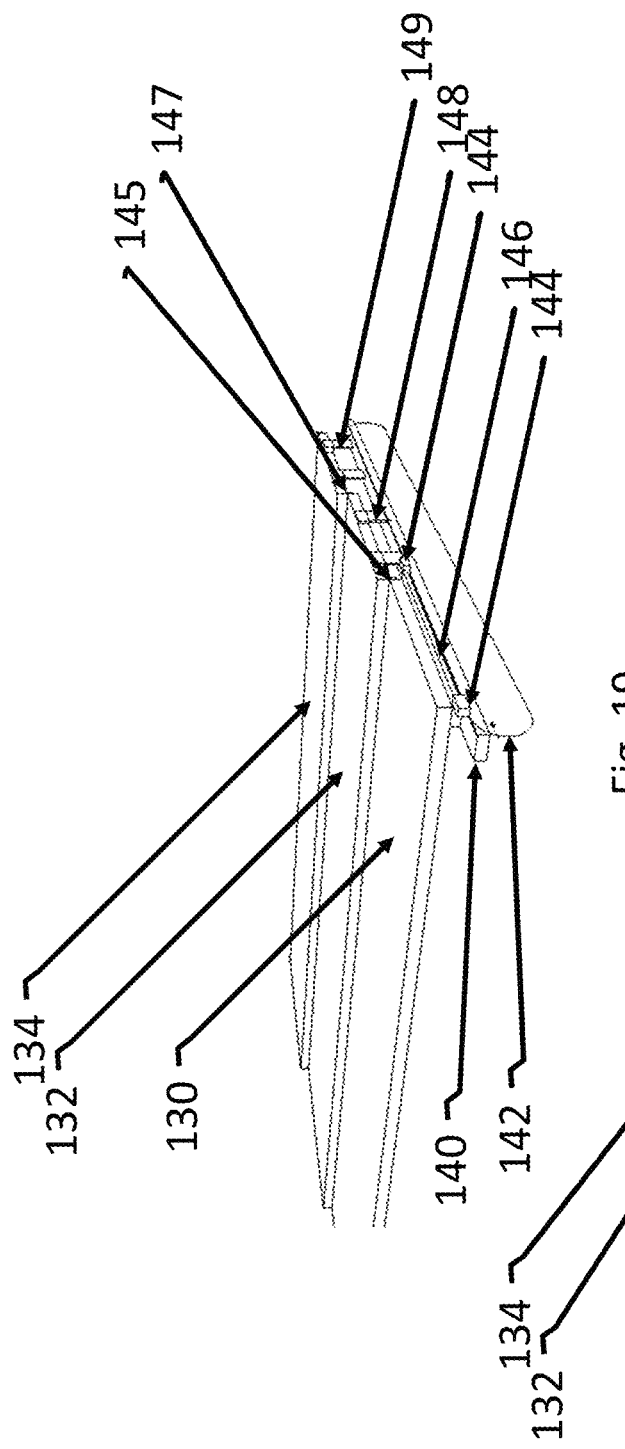
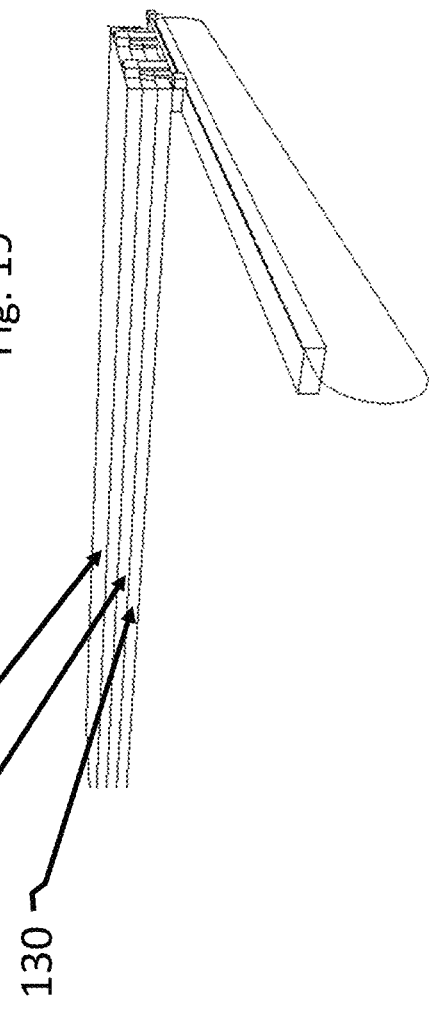
Fig. 19
Fig. 20

DEVICE FOR PHOTOVOLTAIC INSTALLATION

CROSS-REFERENCE TO RELATED APPLICATIONS

This application is a national phase entry under 35 U.S.C. § 371 of PCT/CH2019/050001 filed Jan. 28, 2019, which claims priority to Swiss Patent Application No. 00095/18 filed Jan. 28, 2018, the entirety of each of which is incorporated by this reference.

FIELD OF THE INVENTION

The present invention relates to a device for a photovoltaic installation which allows the use of the area under the photovoltaic modules and optionally includes additional functions for energy storage and fueling electric vehicles.

PRIOR ART

Nowadays there is a variety of different photovoltaic installations that allows the use of the space under the installation. There are photovoltaic (PV) carport solutions, and solutions have already been implemented in which solar modules are fixed or rotatably installed on guy ropes. All of these systems require a large amount of material because the surface of the solar modules is exposed to the elements and must therefore be designed for extremely severe weather conditions at the respective location. Thus, for example in Central Europe, wind forces in the range of 800-1500 N/m2 may occur, which upon implementation requires massive foundations and support systems.

A special type of solar power installation, see published patent application WO2013/044404 (A1), which has already been implemented and has advantages over the prior art, is a system with foldable PV modules which can be folded in unfavorable weather conditions (snowfall, strong wind). In this solution, the modules are foldably suspended between two ropes and are extended by means of a drive in good weather or retracted in bad weather. Foldable roofs that are retracted in adverse weather have long been known as sun protection and/or rain protection and have also been equipped with photovoltaic elements. Overall, even this type of installation needs quite a lot of support material and anchoring, in particular steel or aluminum, because the support structures must be built sufficiently strong in order to absorb tensioning forces. Published patent application WO2014/179893 (A1) shows another system with foldable PV modules.

The published patent applications cited show module supports that are connected to one another and cannot be separated, both in the extended and in the retracted state. By folding they can be brought from an extended state to a folded state. The mechanism for unfolding is relatively complex. Module cleaning can only be integrated with difficulty and a rainproof solution is complex. Another problem is that active parts (mechanism) are distributed across the entire installation. Overall, the complex structure results in a relatively high cost (for installation and maintenance).

Advantages of the Invention

The invention provides lighter and therefore cheaper support structures for photovoltaic modules for solar roof solutions. The invention also provides an installation with low maintenance cost and to thus integrate additional functionality and added value (storage, electric vehicle charging station).

SUMMARY OF THE INVENTION

The invention provides a photovoltaic installation with multiple movable photovoltaic module supports, a structure 11 for mounting the photovoltaic module supports 1 in the protection state and a supporting structure 2 for the photovoltaic module supports 1 in the extended operating state, the photovoltaic installation being characterized in that:
 a) the module supports 1
  are equipped at least on the top with one or more photovoltaic modules 49 that contain solar cells 7,
  are stacked one above the other on a structure 11 in the protection state,
  are spread out in planar fashion on supporting structure 2 in the extended operating state,
 b) a transfer mechanism 3 is present,
  which is designed so as to be able to displace the individual module supports 1 from the protection state laterally away from the stack 4 to a supporting structure 2, and vice versa,
  which is designed so as to be able—during displacement of the individual module supports 1 away from the stack 4 to a supporting structure 2—to spread the module supports 1 out in planar fashion,
 c) a lifting mechanism 15 is present,
  which is designed to lift or to lower the stack 4 from module supports (1),
  which is designed to bring a module support 1 to be transferred in the stack 4, e.g., the top most, in a transfer plane necessary for the displacement, so that the respective module support 1 can be moved in the extended operating state by means of the transfer mechanism,
 d) coupling means 9, 10, 13, 145, 147 for the module supports 1 are present, which are attached to the module supports 1 and configured that
  by a lifting movement of the lifting mechanism 15, a coupling is formed between the module support 1 already extended and the module support 1 to be transferred next on the stack 4,
  the module supports 1 in the extended state are coupled mechanically to each other,
  the module supports can be coupled to each other mechanically via the coupling means in such a way that the module supports already extended are laterally displaced by displacing an individual module support by means of the transfer mechanism together with the individual module support,
 e) a controller 32 for controlling the transfer mechanism and the lifting mechanism is present, which controls, and can monitor, a process flow sequence for extending and retracting individual module supports 1 by means of the transfer mechanism 3 and the lifting mechanism 15.

Starting from the prior art mentioned above, this invention or solution makes reference to the prior art of a solar roof solution, but goes far beyond the current prior art with a new PV module transfer and coupling mechanism. In addition, the concept offers automatic maintenance, which leads to a significant reduction in maintenance costs and also includes the integration of additional functionalities, which creates considerable added value for the customer.

Specifically disclosed is a photovoltaic installation with coupling means or coupling/decoupling means at module supports combined with lifting and displacement means at a buffer station. The coupling/decoupling means on each module support allows simple mechanical coupling and decoupling of each module support with the preceding and subsequent module support. The lifting means causes the coupling or decoupling of the respective module support with the respective preceding or subsequent module support by substantially vertical lifting and lowering the module support. Also, the lifting means serves the stacking of the module support in the decoupled state in the buffer station. The displacement means causes a horizontal displacement of the coupled module supports on the structure by pushing or pulling the respectively last coupled module support (this works, on the one hand, upon extending with subsequent coupling and, on the other hand, during retracting with subsequent decoupling). Expediently, the installation is equipped with a corresponding controller for an automatic process. The above coupling/decoupling means can be equipped for mechanical coupling between the module supports with mechanical coupling elements or/and for the electrical coupling between the module supports with electrical coupling elements.

Among other things, a photovoltaic installation is disclosed, with multiple movable photovoltaic module supports, a structure for mounting the photovoltaic module support in the protection state and a mounting structure for the photovoltaic module support in the extended state, the photovoltaic installation being characterized in that:

a) the module supports
at least on the top are equipped with one or more photovoltaic modules containing solar cells (e. g., crystalline solar cells, bi-facial solar cells, thin film cells or another cell type),
are arranged on a structure one above the other (protection state), such as stacked (e. g., stacked with fixed distances), in particular stacked one above the other,
can be displaced laterally with a transfer mechanism in one or more steps to a support structure, that is to say, spread in a planar fashion,
and may be mechanically coupled to one another in such a way that the already extended module supports are displaced laterally together by the displacement of an individual module support with the transfer mechanism, b) the transfer mechanism
can move the individual module supports from the protection state, e.g., stacked one on top the other, laterally away from the stack to a mounting structure, and vice versa,
may enable a lateral movement in both directions of the stack (if appropriate mounting structures are arranged on both sides of the stack for the displacement),
may be controllable and may carry out the sequence of movements automatically, c) a lifting mechanism is present,
which is may be attached to the structure, and
which may have a drive and a mounting to lift and lower the stack of modular supports,
and brings the module support to be transferred in the stack, e.g., the top most, in a transfer plane necessary for the displacement, so that the respective module support can be moved in the extended position by means of the transfer mechanism,
and which can also be controlled and may carry out the desired movement automatically, d) a coupling for the module supports
which couples the module supports mechanically to each other in the extended state,
which may be attached to the lateral support structure of the module supports and may be designed such that by the lifting movement of the lifting mechanism, a coupling is formed between the module support already extended and the module support to be transferred next on the stack (e.g, the top most), e) a controller
which may control and monitor the process flow sequence (extending and retracting) of the individual module supports with the transfer mechanism for laterally transferring and the lifting mechanism from the retracted state to the extended state,
may be equipped with online access to weather data and forecasts (e. g., wind speed, wind direction, snowfall, rain, storm, temperature, humidity),
and/or may access a local sensor system with current information on, e. g., wind speed, snowfall, temperature, video cameras,
and may be equipped with a control software which, based on this information, decides whether the system should be in the extended operating state or should be transferred to the protection state.

The photovoltaic installation includes photovoltaic module supports 1 which are mounted one on top of the other on a support structure 11, which may include a roof 5, and in adverse weather conditions (e. g., strong wind, snow, protection against vandalism) are put in the operating state from an "off state" or protection state or idle state by being displaced by means of a transfer mechanism 3, 142 to a guide structure 2, 140 (in particular, from a rest position to an operational position). If a vertical transfer means (or lifting means) 15 is additionally present, this transfer takes place step by step. A first element 1 is, for example, displaced in the rails 6 on supporting structure 2, by the transfer mechanism 3 which is, for example, equipped with an electric motor 12 with a spindle, mechanically couples an element 1 at position 8 by means of a latchable catch 13 on both sides and then displaces it by one element width.

Then, the next element 1 is brought up to the height of the rail 6 with the lifting means 15. When lifting, there is a mechanical coupling 9, 10 and may also be an electrical coupling to the previously transferred module support. For example, as illustrated in FIG. 7, the elements may be electrically coupled by means of an integrated connector 18, 19, but also be hardwired among themselves, as illustrated in FIG. 15, 16.

The transfer process for elements 1 is triggered and monitored by a controller. This process is repeated until all elements 1, 1", 1"" are extended or retracted. When retracting, the previously coupled module support, which is located on the stack, is decoupled by lowering the entire stack by means of the lifting mechanism. To ensure a safe decoupling, decoupling elements 162, for example, springs or extendable studs are attached on top of the stack to ensure a reliable decoupling of the respective module support in addition to the gravity of the module support and/or in case of non-vertical stacking arrangements.

The installation or its controller may be designed in such a way that it can carry out at least the following steps in succession in order to extend the module supports into the operating state:

(a) a module support (1") arranged on a stack 4 of module supports 1", 1''' is displaced laterally in a transfer plane by one module support width by means of the transfer mechanism 3 and thereby taken off the stack 4 and placed onto a supporting structure 2, wherein one or more preceding further module supports 1', which lie on the supporting structure 2 and are coupled directly or indirectly with the module support 1", are taken along during displacement, and thereby are also displaced laterally by one module support width, (b) thereafter the stack 4 is lifted by means of the lifting mechanism 15 until another module support (1''') subsequent to the preceding module support 1" reaches the transfer plane and is at the same height as the preceding module support 1", wherein, upon lifting, the subsequent further module support 1''' is coupled mechanically with the preceding module support 1" and thereby is mechanically coupled therewith in the transfer plane, (c) steps (a) and (b) are repeated, preferably until all of the module supports 1', 1", 1''' have been taken from the stack 4 and are thereby spread out in a row in a planar fashion on the supporting structure 2.

The installation or its controller may be designed in such a way that it can carry out at least the following steps in succession in order to retract the module support into the protection state:

(d) a module support 1''' is displaced laterally to a stacking installation by one module support width by means of the transfer mechanism 3, further module supports 1", 1', which are coupled directly, or indirectly via one or more further module supports in a row, to the first module support 1''', are taken along and also displaced laterally by one module support width, respectively, (e) thereafter, the stack 4 of module supports grown in the stacking installation is lowered by means of the lifting mechanism 15, wherein the module support 1''' previously displaced to the stacking installation is taken along, and the coupling to the following support module 1" is released during the lowering (optionally supported by a decoupling mechanism 162), (f) steps (d) and (e) are repeated, preferably until all module supports 1''', 1", 1' are lying one on top of the other on the stacking installation in a mechanically decoupled fashion, and thus are retracted.

In the case of a two-sided arrangement (module supports on both sides of the supporting structure 11), for example, the elements 1 are first extended in one direction and then in the other direction. This process is repeated until all the module supports are displaced from the stack to the support structure, or are retracted again. The controller is equipped with logic and has a sensor system (wind and snow sensor, video camera, etc.) and/or online access to weather data to decide whether the installation should be in the operating state or the "off state". The controller is also equipped with online monitoring.

For logical reasons, the supporting structures 2, 11 are subjected to mechanical tensioning 63, 65 to enable an implementation with low material requirements. A rail 6 is used as a sliding surface and the contact surface between the sliding surface of the rail and the sliding surface of the module support is designed (102) in such a way, that the contact surface is optimized to reject, for example, water and dirt from the contact surface. Lateral openings 103 allow dirt and water to escape. A web 101 prevents the module support from escaping from the support guide 6.

Lateral rollers 55 on the supports can greatly reduce the frictional resistance and thus the necessary drive force for drive 3 and can be advantageous at certain applications.

Element 1 consists of a support structure with longitudinal members 41, 43 at the ends and, depending on the width of the module support and design parameters, additional longitudinal members 42 below the solar elements, which are connected to cross members at the ends 45 or other cross members (depending on the support size) and on which one or more solar modules 49, and light modules without glass, are attached. The solar modules contain interconnected solar cells 7, for example, crystalline solar cells, bi-facial cells, thin film solar cells or another appropriate cell type.

The lateral rails 41, 43 can be equipped with a drip edge 51 and run-off containment 53 to prevent dripping of rainwater between the module supports. To this end, a water collecting device (FIG. 18, 125) is attached to the ends of the module support at the end of the module support. Also, a small tilt of the position of the module support in the direction of the collecting device is recommended to ensure that when it is raining, the water is reliably collected at the side of the water collecting device 125 and can be discharged.

One or more module cleaning systems 21, for example, arranged under the roof 5, allows/allow, during the lateral transfer/retracting/extending of the module supports 1, to clean them. The cleaning systems 21 may, for example, be implemented with tubular elements that are arranged longitudinally along the elements 1, and that are equipped with optimized openings or nozzles 22 for air or a cleaning liquid and/or a mechanical brush 23 or a scraper. Rotating elements 29 in the vertical direction or alternatively also in the horizontal direction can considerably increase the cleaning efficiency in locations with a high degree of fouling. An automatic operation of the cleaning installation reduces the maintenance costs of the installation considerably.

Additionally, upon customer's request, the photovoltaic installation may be configured with lighting elements 150 and/or smart cell transmitters (i.e., for example mobile radio transmitters) or other types of radio equipment 152 to provide a further additional benefit for the customer at a low cost. The bottom 160 of the elements 1 can be designed as an advertising surface or can additionally be equipped with lighting elements, which can provide a further additional benefit.

So-called "jersey" concrete elements 120, which serve as impact protection and tire deflectors for cars and can also be designed so that the installation does not require any further anchoring to the ground after installation, are advantageous.

Also advantageous is a locking mechanism for the stack in the retracted state, which ensures that the stacked elements 1 are mechanically secured or clamped, which can be achieved, for example, by lifting by means of the lifting mechanism 15, the top most element 1 touching the bottom of the roof 5 and then a moment is applied to the spindle drive 15 at the drive so that the modules are clamped, cannot slip in the wind and thus an anti-theft device is guaranteed, since, for example, the drive is then locked in the switched-off state and would have to be unlocked from this locked state, which is associated with considerable effort and specialist knowledge.

The area under the module stack, but overhead, thus no parking space is sacrificed, is ideally suited for accommodating control box 32 with a controller, for accommodating inverters, high power connections for the network connection and the current distribution, but also electrical energy storage and means for fueling electric vehicles. If the installation is equipped with means for charging electric vehicles, pull-out or extendable cables 33 with plugs 34 can be lowered through the openings 31. In this case, a control panel 30 for processing the fueling transaction of the customer is useful. A control box arrangement with one or more extendable cables on one or both sides of the vehicle is recommended for electric trucks with high power requirements, also a mechanically-controlled means can establish a plug connection to the vehicle automatically from the top, if the vehicle is equipped with corresponding receiving means. In this case, the height of the support structure 11 must be adjusted so that the truck can pass under the control box 32 and the controls box arrangement 32 must be adjusted accordingly, as well.

A particularly attractive combination for larger installations consists of the photovoltaic roof already described above, an electrical storage system to maximize the self-consumption of the photovoltaic electricity by the customer and a charge or fast charge means for the quick fueling of electric vehicles (>30 kW per vehicle). The charge or fast charge means accesses also the existing electrical storing system, if necessary, to provide the necessary high charging power without the power supply of the customer having to cover these high power peaks.

BRIEF DESCRIPTION OF THE FIGURES

The invention is described below by way of example with reference to the figures which show schematically:

FIG. 3: solar module support with details;

FIG. 3b detail from FIG. 3, showing rain eaves and drain;

FIG. 9a: fully assembled solar module box;

FIG. 9b: infrastructure elements for the construction of the c: installation;

FIG. 9c: infrastructure elements for the construction of the installation;

FIG. 12: sequence for the construction of an installation;

FIG. 19: means for extending the module supports horizontally by means of a belt or chain drive without a vertical lifting means in the extended state;

FIG. 20: means according to FIG. 19 in the retracted state.

DETAILED DESCRIPTION OF THE INVENTION

Figure 1:
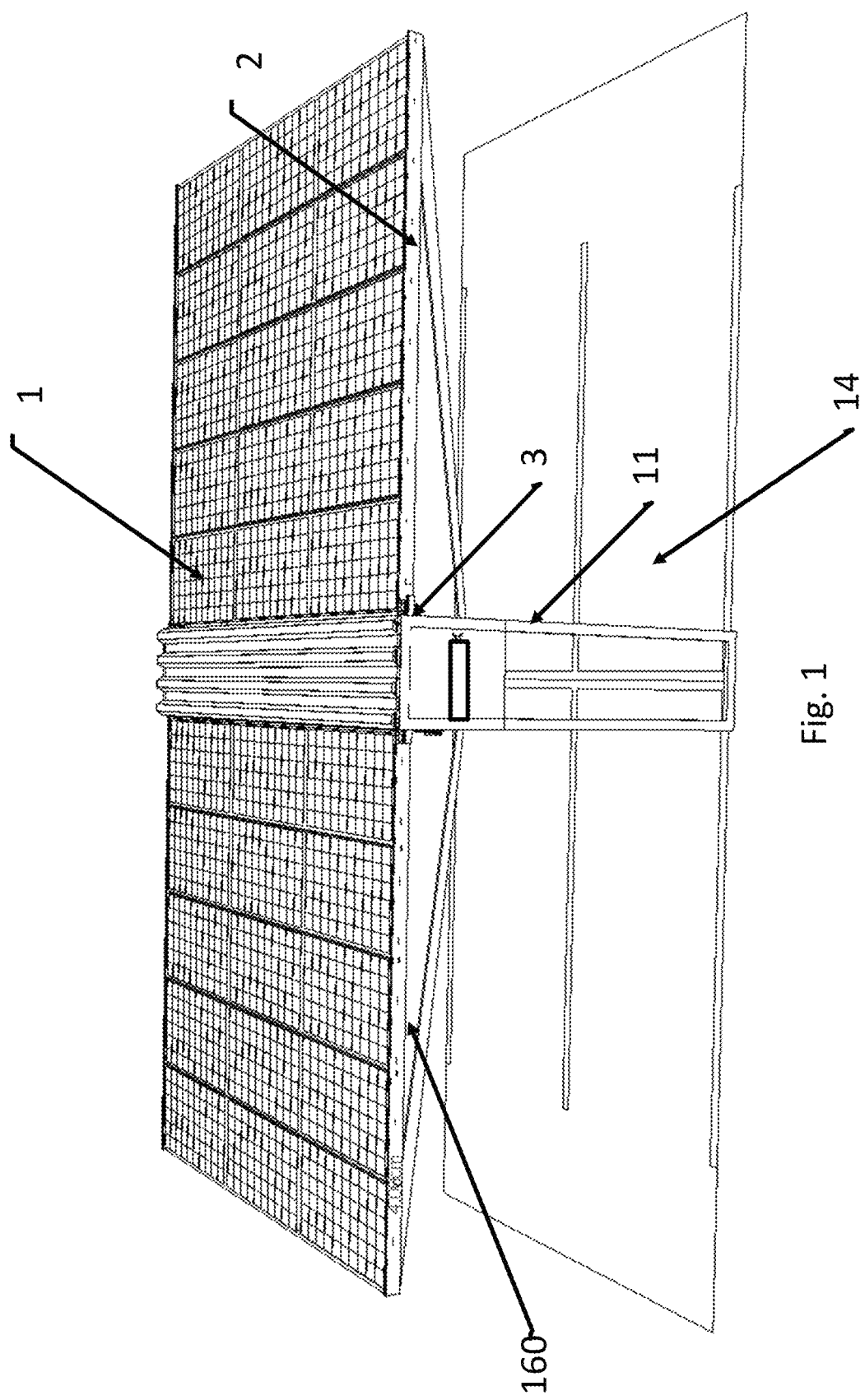
FIG. 1: schematically of the structure of the installation.

The device in this invention is a lightweight solar power installation. A basic variant of it is shown in FIG. 1 in the operating state. The solar module supports 1 are extended step by step. A supporting structure 2 provides lateral guides 6 (FIG. 2b) for solar module supports 1. The lateral guide 6 can be equipped with a step 101 for mechanically securing the module supports (no slipping possible) (FIG. 2b). In addition, a minimized contact surface 102 on the rail, or alternatively a minimized contact surface on the lateral support 45 and lateral openings 103 increase the tolerance to fouling or freezing of the element 1 on the support. A drive, for example, configured with a motor 12 (FIG. 4), which is, for example, coupled to a threaded spindle, allows the modules to be transported horizontally.

The lift of the horizontal drive is configured in a length that allows a module support to be displaced at least one module width from the stack. The horizontal drive thus displaces the first module from the stack by one module width onto the support structure. The next module support is then lifted to the transfer position. Then, the horizontal drive displaces this next module together with the preceding module by one further module width.

As illustrated for example in FIG. 19 and FIG. 20, the horizontal drive can also be configured with a ribbon, a rope or a belt 142 over the entire length of the horizontal guide 6 of a support structure 2.

Figure 2A:
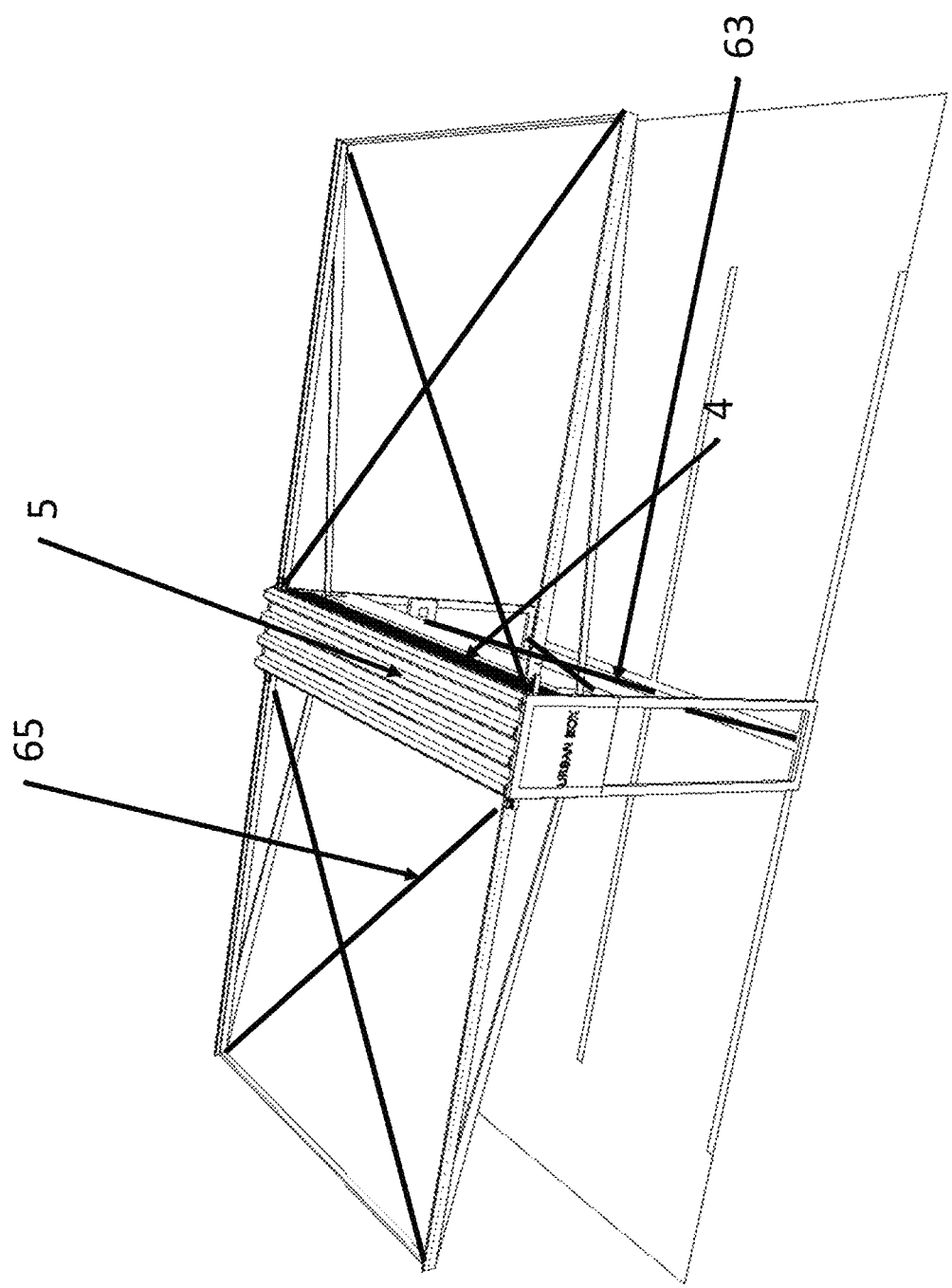
FIG. 2a: schematically the installation with modules in the retracted state.
Figure 2B:
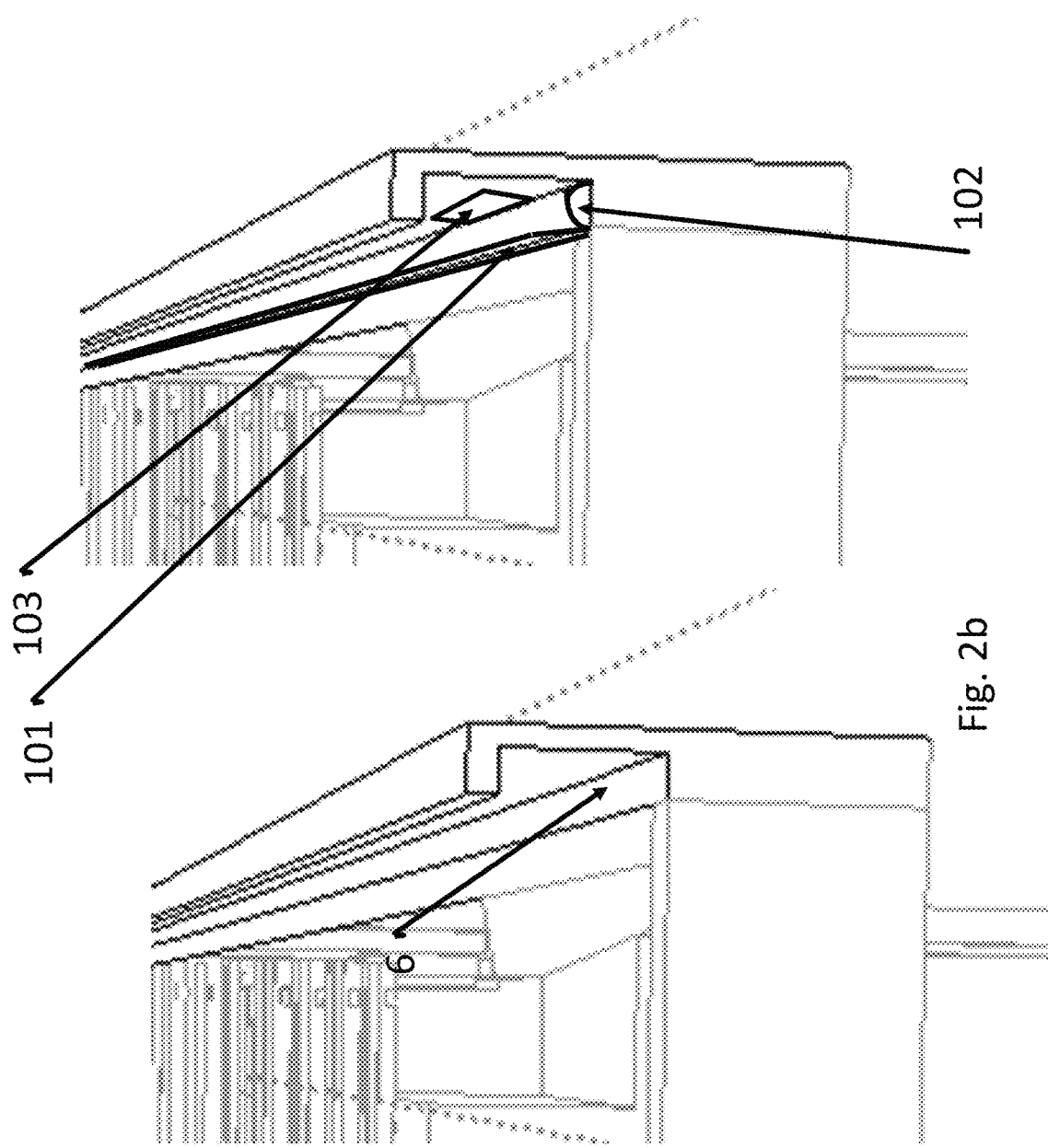
FIG. 2b: details of the support rail on which the module supports (1) slide or roll.
Figure 5:
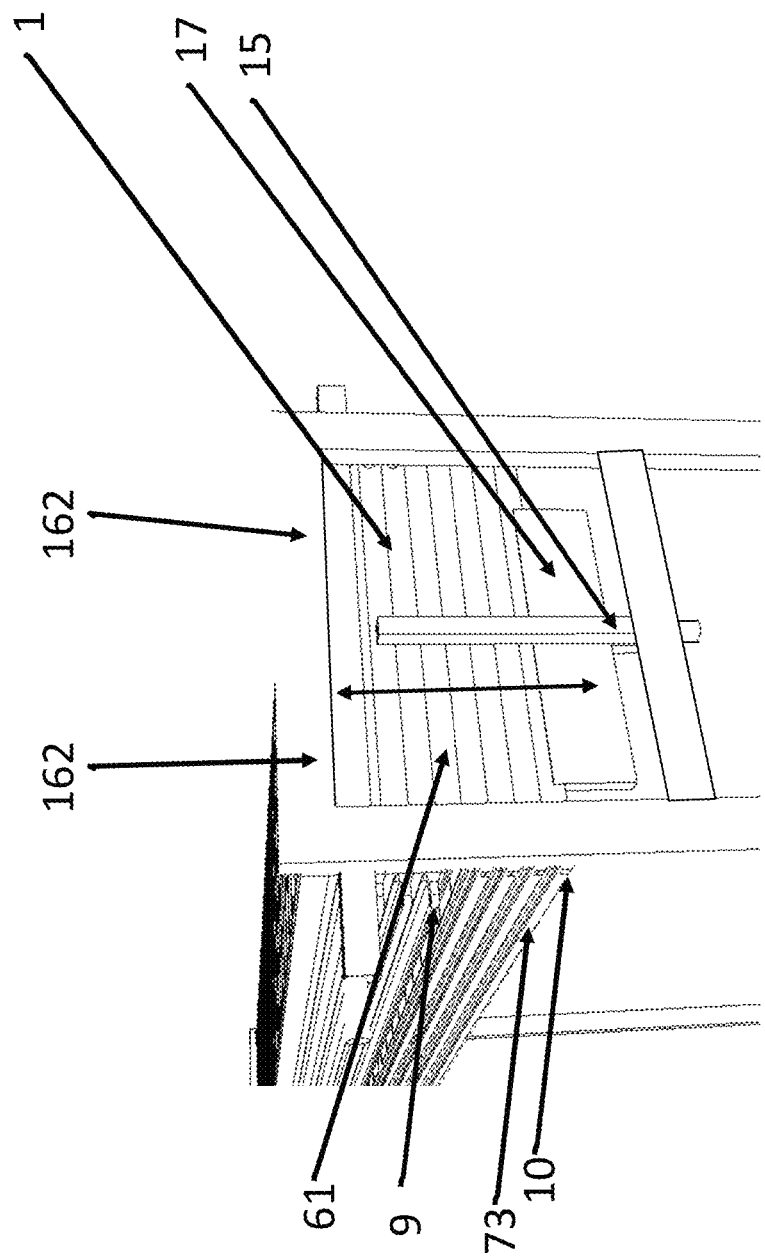
FIG. 5: detail with transfer unit (lifting unit) for transferring (lifting) the solar module support in the vertical direction with position of the decoupling elements above the stack.

FIG. 2a shows the device in the retracted ("off") state. The solar modules are retracted and stacked (stack 4). FIG. 5 shows a section of the device and thus the stacked solar modules (stack 61) in more detail). A roof 5 protects the solar modules from snow loads or high wind loads. The supporting structure 2 is designed in such a way that it can, on the one hand, absorb the weight of the solar module supports 1 as well as the forces generated by the wind at moderate wind strength. It is further designed in such a way that due to the low windage area it can withstand very high wind loads (150 km/h), if the solar module supports 1 are retracted. Struts 63, 65 increase the stability further. A mechanical safeguard 75 (FIG. 10) which may be attached to transverse struts of the structure 11, and which may be equipped in addition with a stiffened full-area sheet-metal element for improved protection, prevents the slip of the individual solar module supports 1 in the stack 4, 61. A so-called "hurricane" variant for wind speeds of up to 220 km/h can be implemented with manageable additional effort.

FIG. 2b shows in detail the guide 6 in the substantially horizontally oriented cross members of the structure profiles 2, which shows the zone in which the module supports 1 slide and are mounted in the extended state. The module support 1 is illustrated in FIG. 3. The module support 1 can be equipped with one full-area or several part-area solar modules, equipped with crystalline solar cells 7 or other solar cell types, for example thin film cells. The solar modules are mechanically connected to the top of the module support. In the typical arrangement, the solar cells are mounted with short distances between them, in order to obtain a high energy density. The cells may, of course, be assembled with greater distances between them (e.g., 5×9 cells instead of 6×10 cells per 1×1.65 m2), thereby forming distances in the range of several centimeters and a pattern is formed on the bottom surface in sunshine and more light is present on the bottom. This variant can be combined with bi-facial cells, which means that part of the light on the underside of the module can be captured again through the back of the solar cell resulting in an increased energy yield.

The module support 1 (also referred to as element) which is configured with a right angle module framing, has lateral support structures 41, 43 on the longitudinal sides and further mounting structures 45 on the wide sides, depending on the length of the support, however, additional mountings (42, under the solar module, not visible), as well, between 41, 43 for additional stiffening. The mounting structure 45 can be coupled with the coupling mechanism 13 of the transfer mechanism 3 at least at one position 8 which then enables a lateral displacement of the support 1. Furthermore, a coupling 9 for mechanical coupling to the already previously extended module is located on the module support 1. The coupling 9 is located in the region of the lateral supports 45. On the opposite side of the coupling 9 of the module support, a complementary coupling 10 is attached in each case.

In the case illustrated, the module support 1 has about 180 solar cells and a width of about 1 meter and a length of about 5 meters. Optionally, the module support 1 can be equipped with a drip edge 51 (FIG. 3*b*) and a run-off containment 53 (FIG. 3*b*) in order to prevent rainwater from dripping between the module supports. In this case, it makes sense to provide the installation with a slight slope (several parts per thousand) along the module support 1 in order to ensure a defined runoff of the rainwater. In addition, in this case, an eave is attached along the lower lateral cross member of the support structure 2 for the defined drainage of the collected rainwater. The lateral mounting system 45 may have lateral rollers or ball bearings 55, by means of which the module support 1 slides, whereby the frictional resistance for the displacement of the module supports 1 is massively reduced. In doing so, a sensible pairing of materials is selected to minimize the resulting coefficient of friction.

Figure 4:
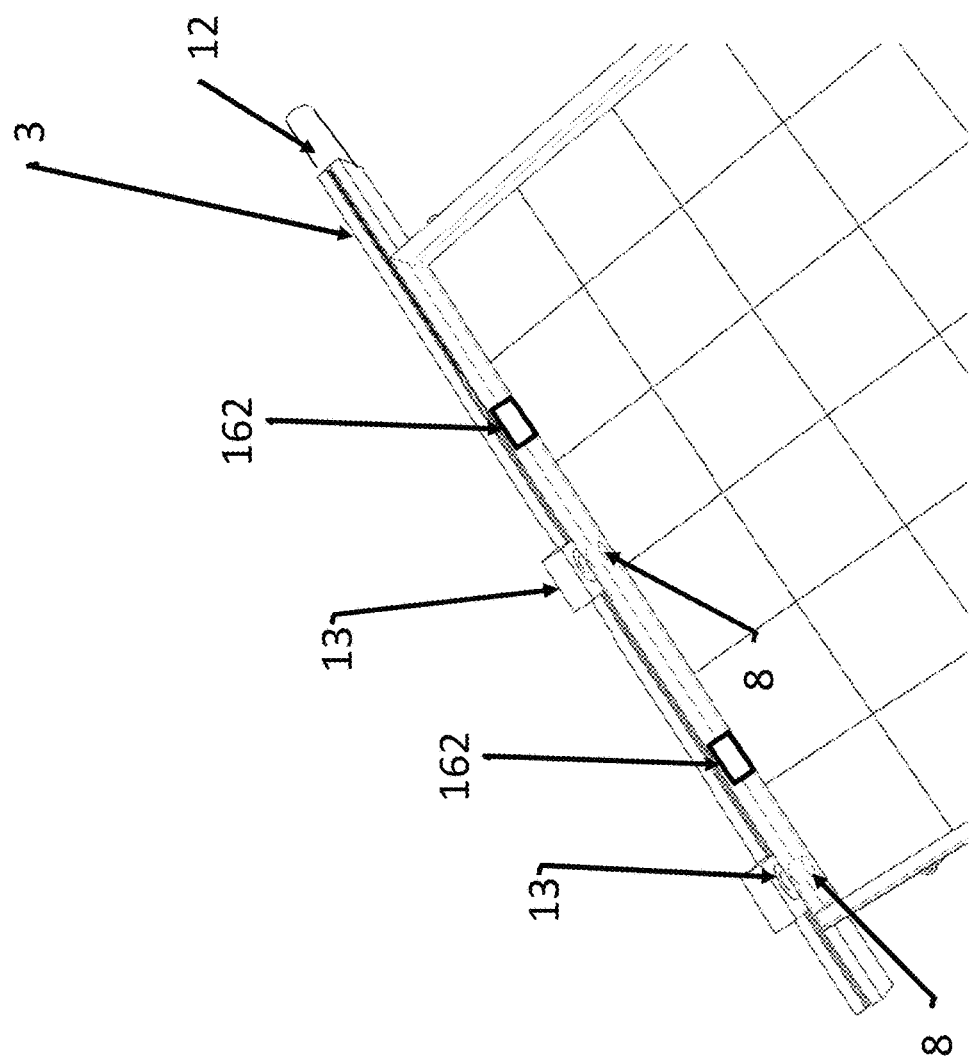
FIG. 4: transfer unit with solar module detail for the linear horizontal transfer of the solar module supports and position of the decoupling elements, which ensure decoupling when lowered.

FIG. 4 illustrates the transfer system 3 for the horizontal movement. In this case, said transfer system 3 is equipped with a ball screw or a threaded rod (in FIG. 4 not visible) and implemented with motor drive 12. The pin drives 13, which are equipped with extendable pins, move on a mounting which is coupled to the spindle or the threaded rod. The lateral movement can be implemented also by other methods, for example pneumatic or hydraulic cylinders, belt drive, etc.). The pin drives 13 attached to the transfer system (e.g., electrically or pneumatically controllable) can extend a pin which engages the corresponding opening 8 in the mounting 45 of the module support 1, allowing then a reliable transfer of the module support with the horizontal drive 3. This mechanical coupling can also be configured with other methods, e.g., toothing.

Figure 10:
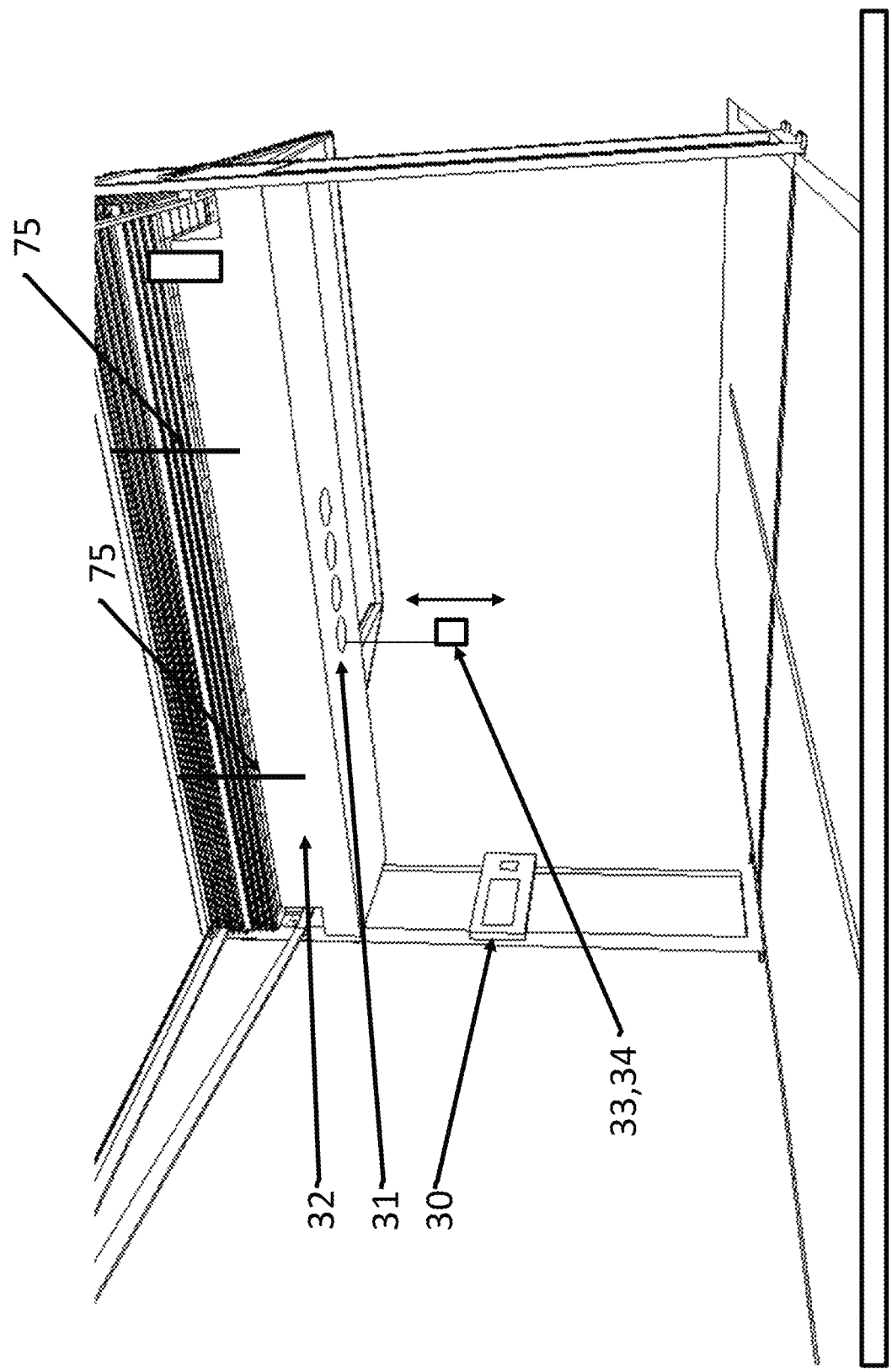
FIG. 10: Installation with control box and control panel.

After the transfer by one module support width in one direction (transfer is possible in both horizontal directions), the module stack 4, 61 is lifted by one module support distance so that the next module support 1 can be transferred. After all of the module supports have been extended, a last or bottom most element 73 (i.e., a last or bottom most element 73 of the original full stack 4, 61, FIG. 5) is lifted to the transfer height (if an electrical/mechanical coupling is used 18, 19), that then establishes the electrical coupling to the extended solar module supports and enables a discharge of energy (electricity) to the inverter, which may be located in the control box 32 (FIG. 10). This element 73 has couplings 9 on both sides, so that the current can be discharged from both sides. In areas without snow and without very high wind loads, roof 5 can be dispensed with. In this case, the aforementioned lowest (or last) element 73 could also be equipped with solar cells.

Figure 6:
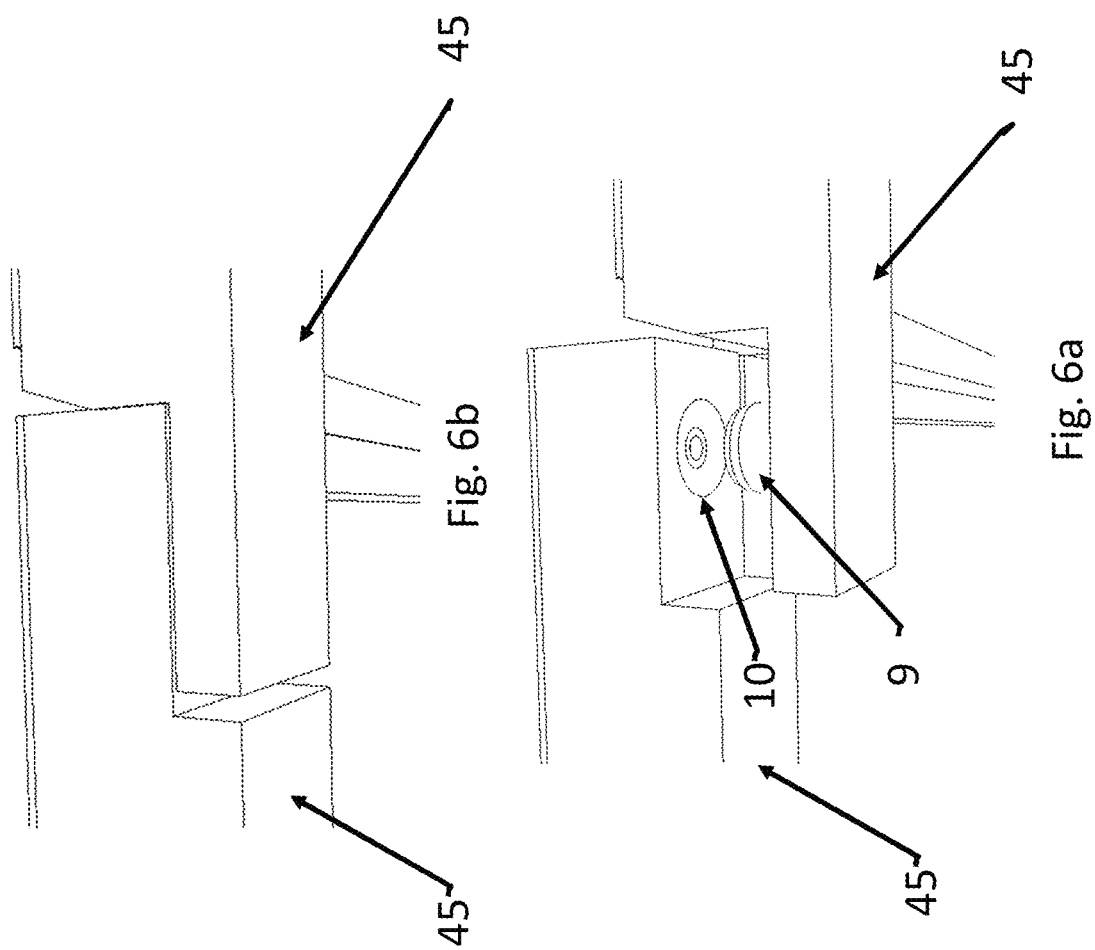
FIG. 6a: detail of the mechanical coupling of the solar module supports, view showing the module supports before lifting by the vertical drive 15.
FIG. 6b: detail of the mechanical coupling of the solar module supports, view after lifting.

A mechanical coupling is necessary at least to retract the module support 1 if the horizontal transfer mechanism 3 is embodied according to FIG. 4. A possible embodiment thereof is illustrated in FIGS. 6*a* and 6*b*. It shows the receiving elements 10 in the already transferred module support and the counterpart 9 in the next support which will be mechanically coupled with each other after lifting the next support.

Figure 7:
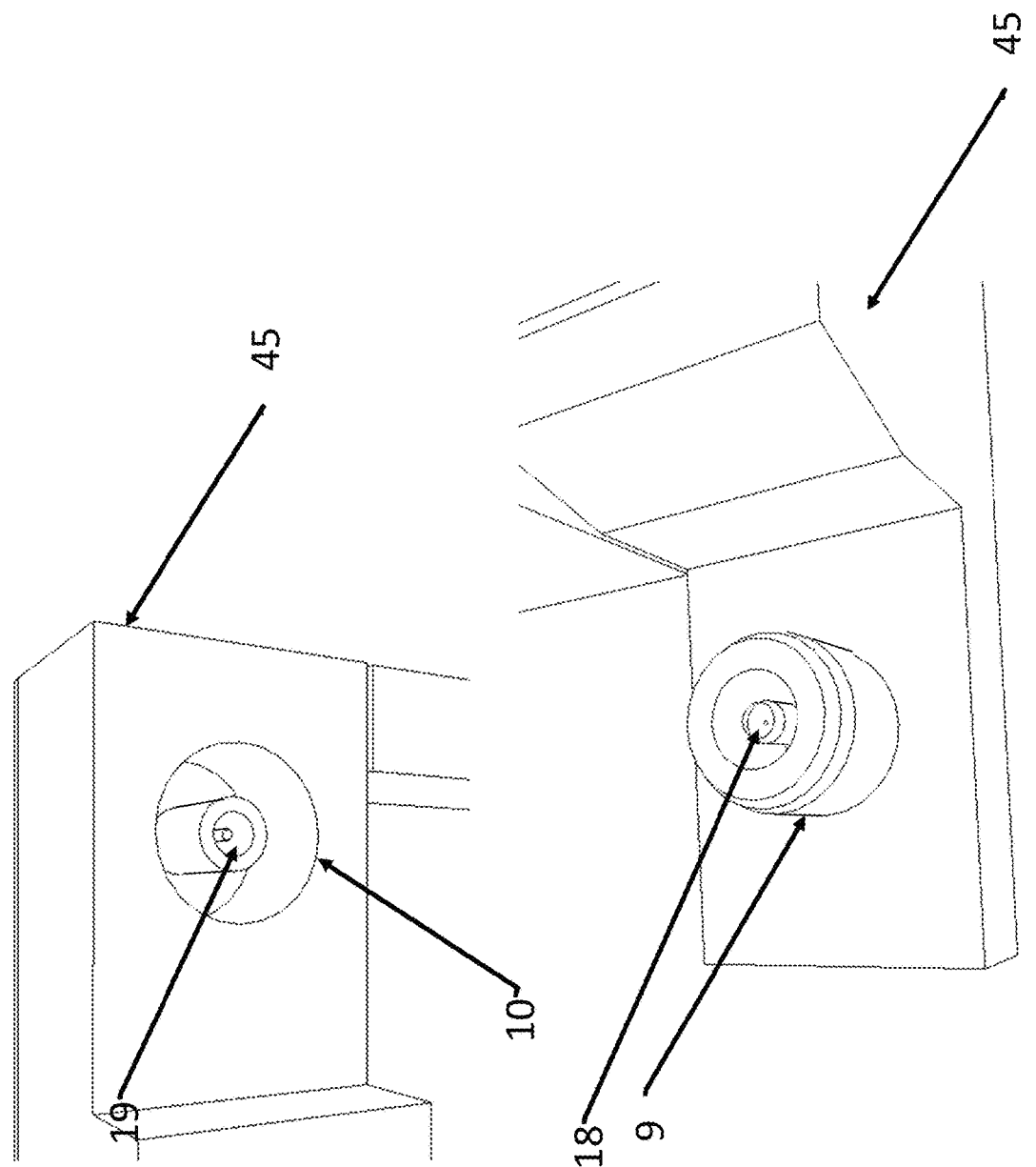
FIG. 7: detail (a, b) of the electrical coupling of the solar module supports.

FIG. 7 illustrates a possible mechanical and at the same time electrical coupling. A socket 18 is injected into the center of the coupling unit 9. For example, the socket element used in commercially available, proven solar plugs can be used as the socket. The counter element 10 has a pin 19 in the center. For this element, a plug counterpart of a proven plug can also be used to ensure a robust electrical connection over the life of the installation.

Figure 15:
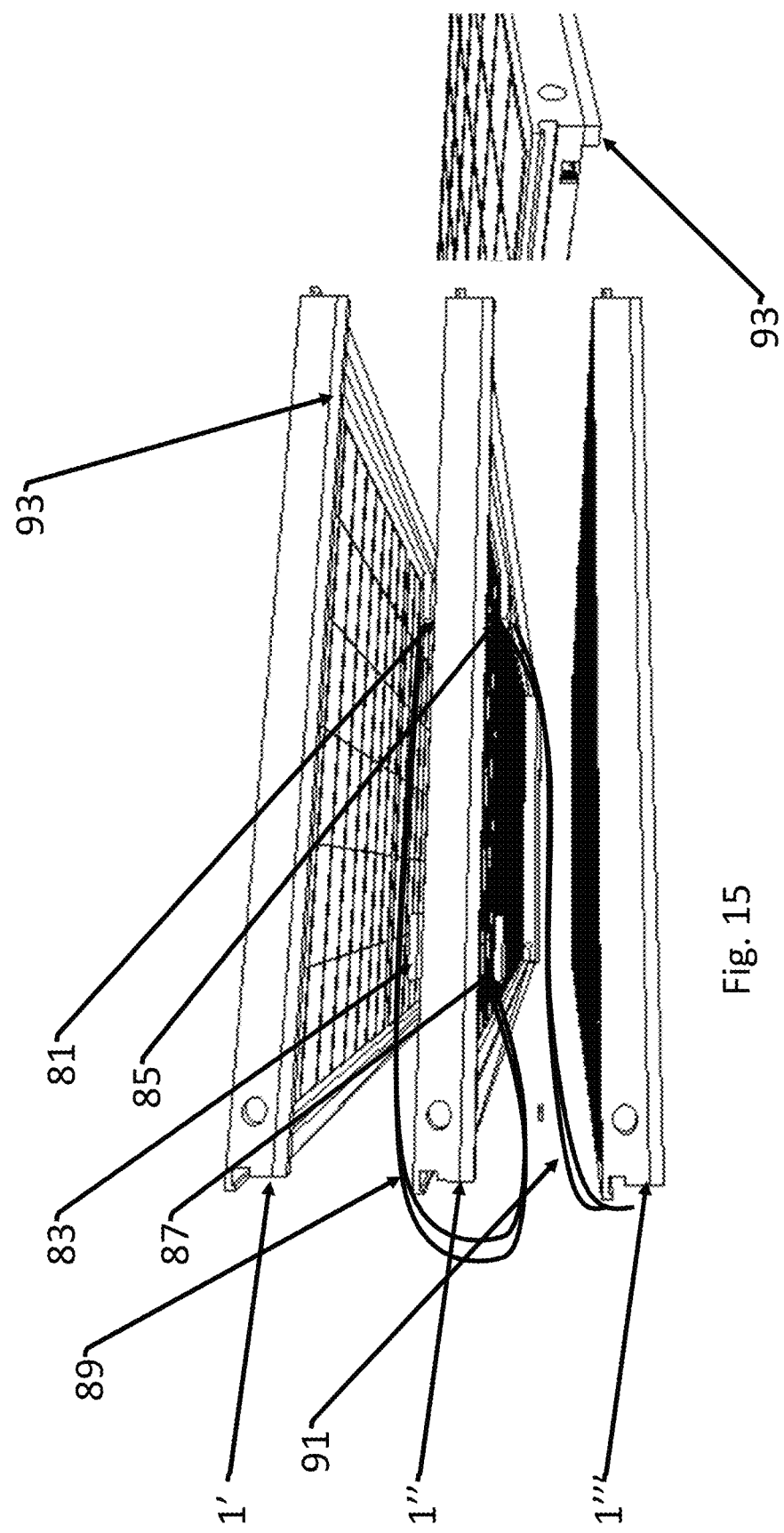
FIG. 15: cabling variant fixed; modules in the stack, shown at a greater distance for a better understanding.
Figure 16:
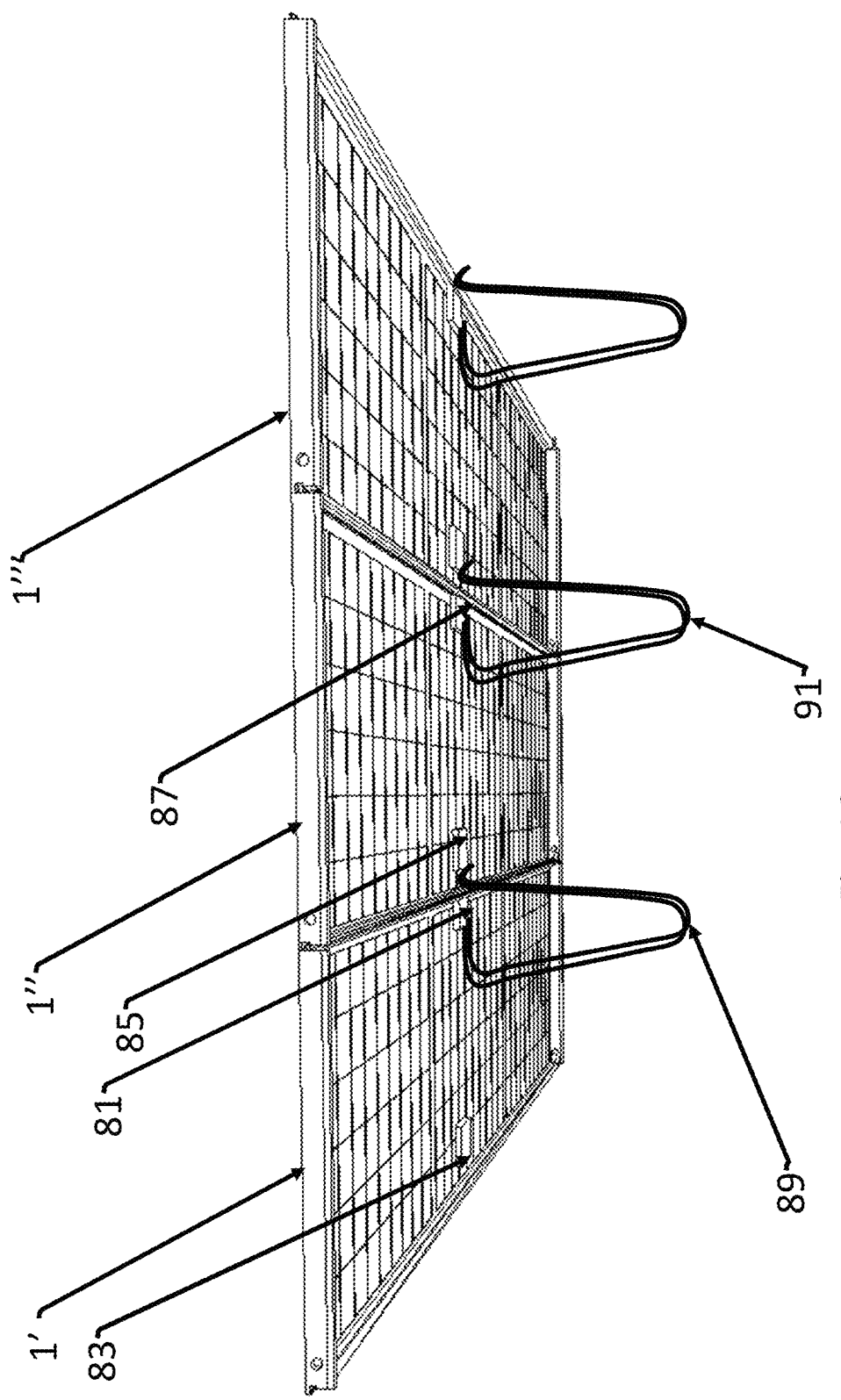
FIG. 16: cabling variant fixed; view of the modules in the extended state.
Figure 17:
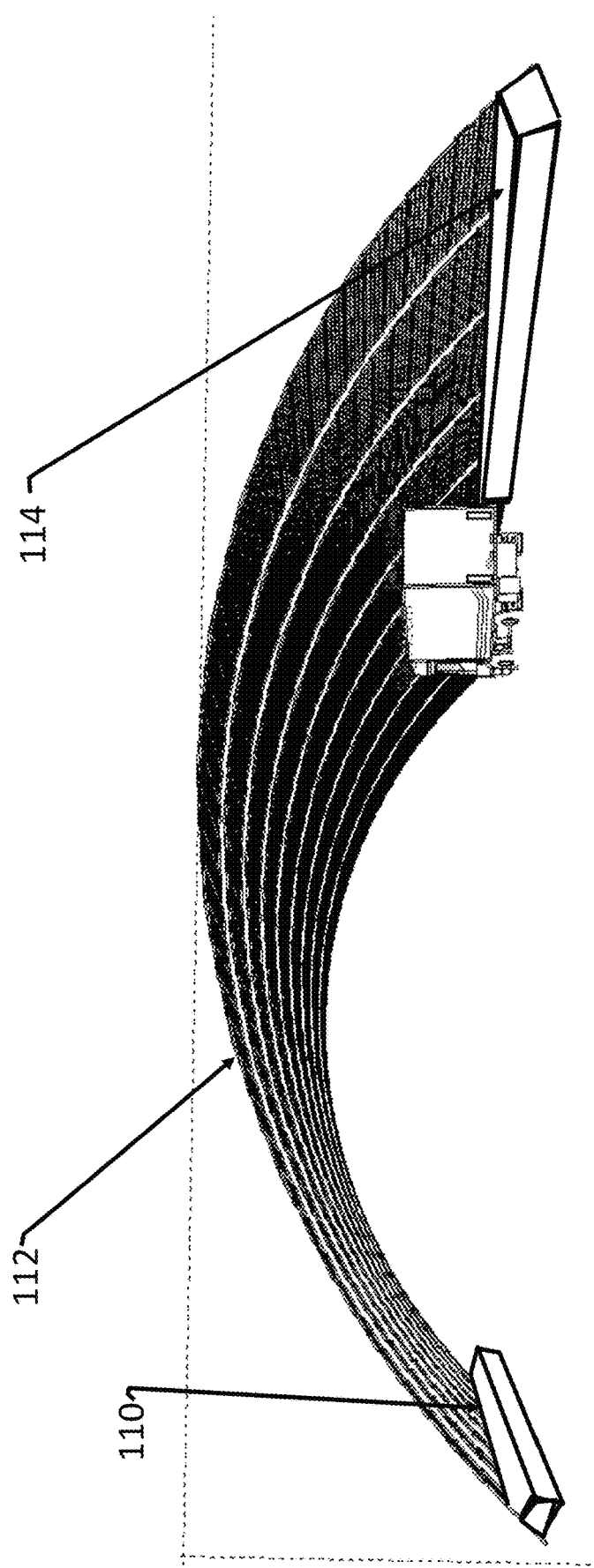
FIG. 17: variant of the installation with curved, arch-like guides and with adapted stacking units 110, 114 for stacking the modules 112.

Another variant for the electrical coupling of the module supports is a fixed electrical wiring, as illustrated in FIGS. 15 and 16. In this case there are junction boxes on the solar module support. From the top support 1' an electrical connection 89 is established from box 81 to box 87 of the support 1" below. Furthermore, there is a connection 91 from the box 85 of this support 1" to the box of the support 1''' below, and so on. In the extended state, the cables hang below the solar module supports as illustrated in FIG. 16. A spacer 93 prevents the cables from becoming jammed in the support stack 4, 61. This spacer 93 is also useful in the variant with mechanical/electrical coupling, in order to prevent scratching of the module surface or a collision when retracting.

In a volume production the photovoltaic module support is configured as an integrated solution for the supporting structure, the transfer function and the electrical connections for example, by injection molding or similar methods.

The solar module supports 1', 1", 1''' are electrically interconnected so that sensible voltages are created for the inverter. In the case of the module support (1) according to FIG. 1 with about 180 cells on one support 1, it is useful to interconnect them with 2×90 cells or 3×60 cells in series. The module supports are interconnected in series, wherein one connection interconnects the module supports in series. The 2nd return connection (e.g., on the side of the respective second mounting 45 on the opposite broad side of the module supports) then establishes the electrical connection from the foremost module support (i.e., from the most extended module support) to the inverter (which, for example, is located in the control box 32). This means there is a connection between the plug-in couplings on the module supports. The foremost module has an electrical connection from the solar module outlet side to the electrical return connection, which closes the electrical circuit after extending.

Figure 8:
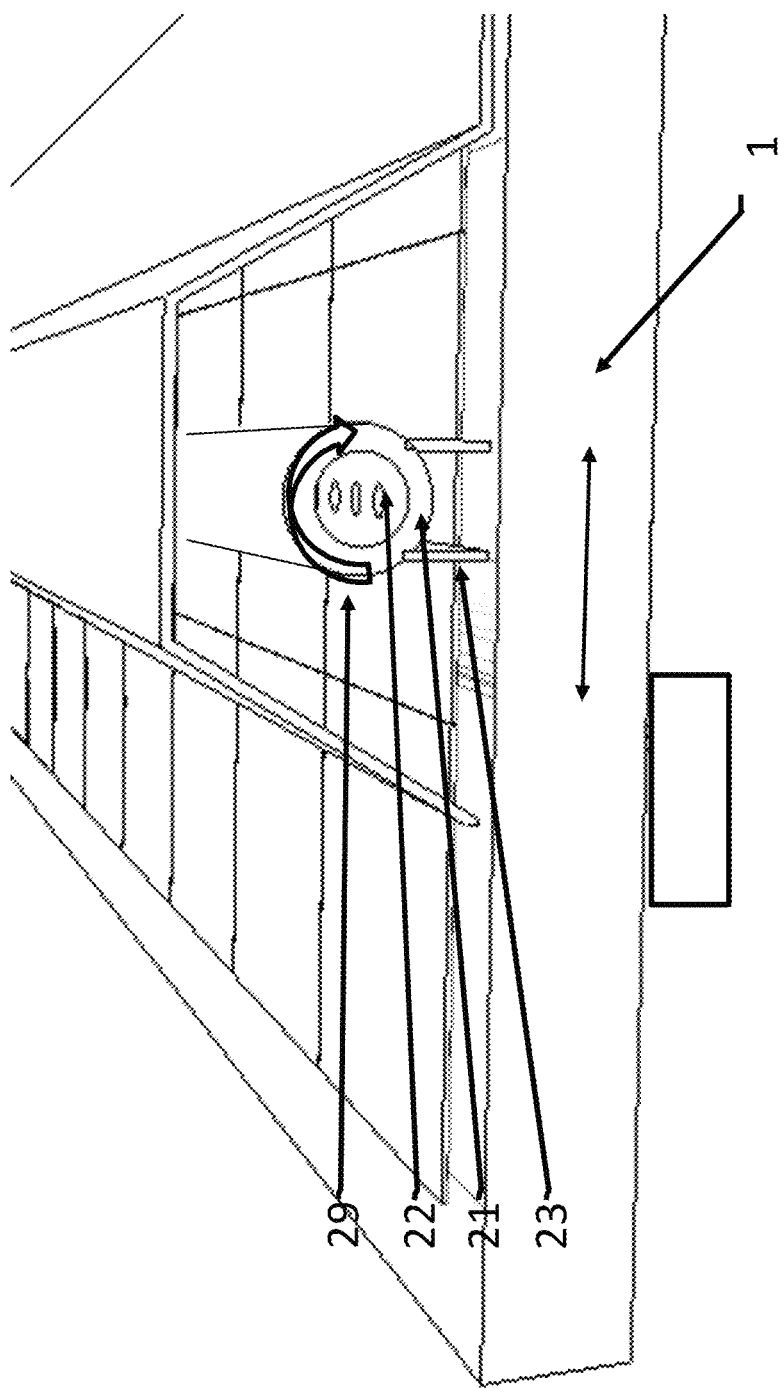
FIG. 8: cleaning systems for the solar module supports.

Regular cleaning, especially of the solar cell surfaces, is necessary for a stable energy yield of the solar power installation. A cleaning of the solar cell surfaces, e.g., in the installation illustrated in FIG. 8, can be implemented in a simple way automatically during the module support transfer by means of a spraying device 21 with nozzles 22 through which air, water or another medium can be blown or sprayed. In areas with low water availability, recycling/cleaning the water makes sense. Lateral mechanical brushes 23 increase the cleaning efficiency. For areas of high degree of fouling, a rotating cleaning arrangement 29 with multiple brush elements 23 or cleaning system with brushes and liquid can be employed, which rotate perpendicular with respect to the photovoltaic module surface above it.

The production costs of the solar power generated are particularly important for solar systems. The assembly, transport and installation costs of the installation are therefore of central importance. In the case of this invention, these costs are optimized in that the complete installation 28 can be completed at the manufacturer and can be transferred to the installation site as a module (FIG. 9). At the installation site (FIG. 9b) only simple elements (such as, e.g., foundations 70, possibly combined with anchors for absorbing tensile forces or a foundation according to FIG. 18 (120), a power connection 71, and rainwater drainage 72) are necessary.

In the retracted state of the module supports, the control box 32 is located underneath said module supports, providing enough overhead space for housing the controller, the power electronics and the solar inverters. In addition, charging stations (power electronics, controller, cables) can also be accommodated in the box. Extendable electric charging cables with plug-in coupling 33, 34 through the openings 31 allow the fueling of the vehicles located underneath and are protected from damage by the retraction. Plug-in couplings can also be attached laterally (e.g., at or near the wide side of the control box 32) which may be advantageous for long vehicles (such as, e.g., electric trucks). In this case, the structure height is adjusted in such a way so that electric trucks can pass under the control box. Subsequent retraction of the cables ensures that they are protected from vandalism and any damage and that operating costs are low.

If the trucks are equipped with plug means on the roof, robotic arms can be attached in the control box 32 and insert the cable directly on the truck, with no manual intervention necessary.

The lateral control panel 30 serves to register the user, but it can also be used for service and maintenance purposes of the installation.

The controller in the control box 32 is of central importance. On the one hand, it determines through Internet access or an on-site sensor system for, e.g., wind, snow and/or video monitoring, if weather conditions allow an extension of the modules or an immediate retraction is necessary, on the other hand, it ensures that the extension sequence runs reliably. The extension sequence is as follows. The top most solar module support is brought in the transfer position (at the height of the horizontal guide rails 6 of the support structure 2) by means of the vertical drive 15. Then the horizontal drive 12 moves the pin drive units 13 to the module support openings 8. Subsequently, the pin in the pin unit 13 extends into the openings 8. For this purpose, a drive (electromagnet, motor, pneumatics or the like) is expediently contained in the pin unit 13. Subsequently, the solar module support 1 is moved by means of the transfer mechanism horizontally from the stack 4, 61 to the horizontal guide profiles 6 of the support structure 2 by exactly the distance between the center of the couplings 9, 10 on solar module support, so that subsequently, when lifting the following module support, a mechanical coupling can take place. Depending on the configuration, the stack 4, 61 can be preconfigured with, for example, five module supports for the extension direction A and five module supports for the extension direction B. In the case illustrated here, the first module support is displaced by one module width in direction A. Then, the horizontal drive 3 retracts the pin drives 13, again, and goes into the waiting position for the transfer of the next module support. The vertical drive 15 then lifts the module stack 4, 61 so that the next module support is in the transfer position. During the lifting movement, the coupling element 9 of the lifting module support engages the counter element 10 in the module support that has already been displaced and is thus mechanically (optionally mechanically and electrically) coupled to the previously displaced module support. Subsequently, with the horizontal transfer unit 3, the lifted module support is displaced by one module unit and the procedure is repeated until all five modules have been displaced in direction A. Subsequently, the same process is repeated in the direction B. At the end, the bottom most unit 73 (if the mechanical coupling is equipped with an electrical coupling 18, 19) is lifted, whereby then the module supports are also electrically coupled. The unit 73 is connected to the inverter, as a result of which the power generation can start. If the modules have a fixed electrical connection (e.g., by cable) (FIGS. 15, 16), element 73 is not necessary and the last modules in each direction have an electrical connection to the inverter.

In the event of frost, the controller can be configured so that the module supports 1, if extended, are moved at regular intervals to prevent freezing on the profiles.

In addition, storage elements can be accommodated in the control box 32, which, on the one hand, allow the installation user to optimize the self-consumption of the adjacent loads (premises, etc.), but, on the other hand, enable the necessary high power for rapid charging of the electric vehicles without having to be dependent on a very high performance of the connection cable.

A particularly important feature of this arrangement, especially in relation to charging, is that no parking space is wasted and only minimal adjustments to the infrastructure are necessary, which is not the case with classic petrol stations.

Figure 11:
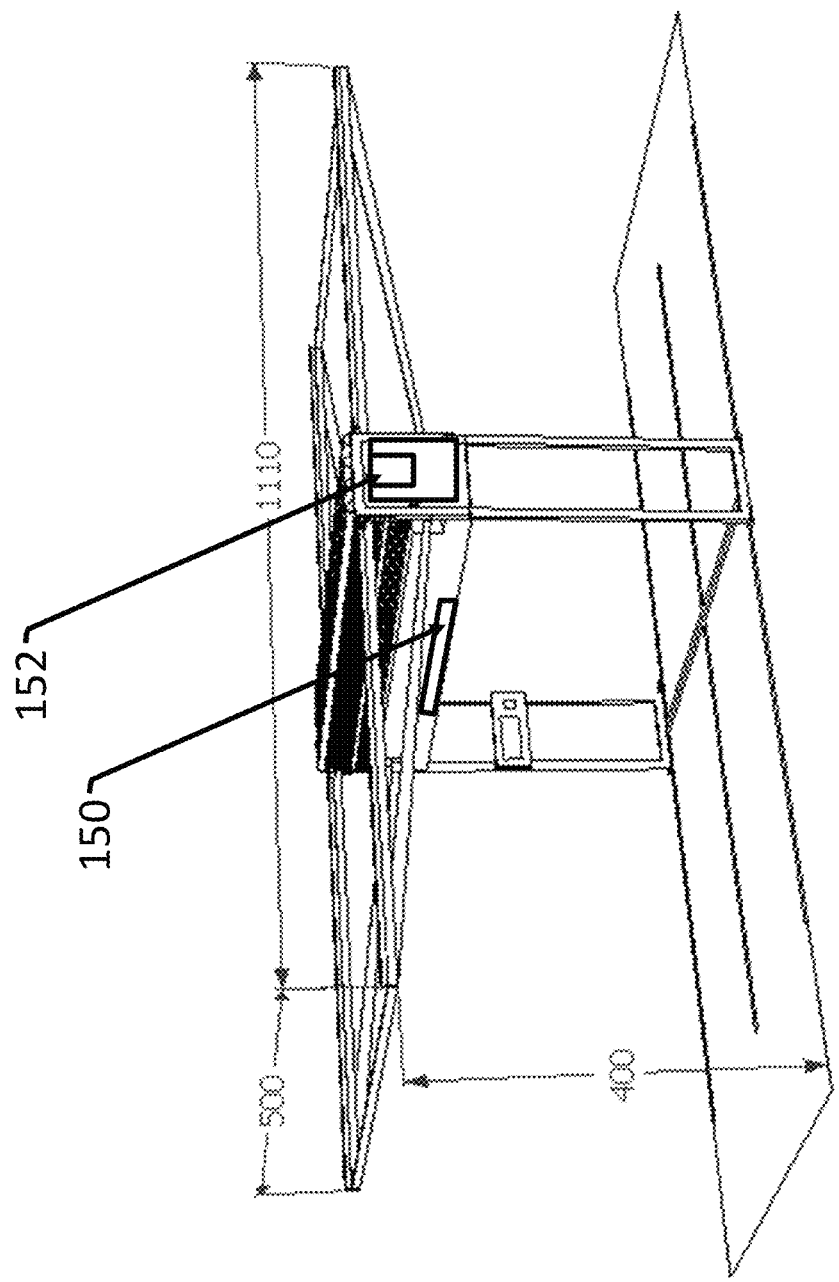
FIG. 11: Typical dimensions (in mm) of an installation for 4 parking spaces with means for lighting and smart cell.

FIG. 11 shows a first sensible configuration of the installation over four parking spaces. The installations can be lined up. Also, a variant may be designed such that units (FIG. 9) are prefabricated, which consist of several parallel rows of solar module supports (multiple units (28) longitudinally lined up with, for example, common support structure and common central lifting/displacement units, whereby further cost savings can be realized. Also, multiple installations can be operated with one controller.

FIG. 12 shows the steps for setting up this solar power installation. After the parking spaces have been equipped with the foundations, power supply and possibly water drainage, the installation will be delivered. Then the side structure 2 is attached to the unit 28. The supports (11) are mounted and the unit 28 is lifted and brought in position and the power supply is connected.

After the mains connection, the system initializes itself automatically and extends the module supports, provided that the local weather data, which are received via the Internet or determined using local sensor data, permit extension.

Figure 13:
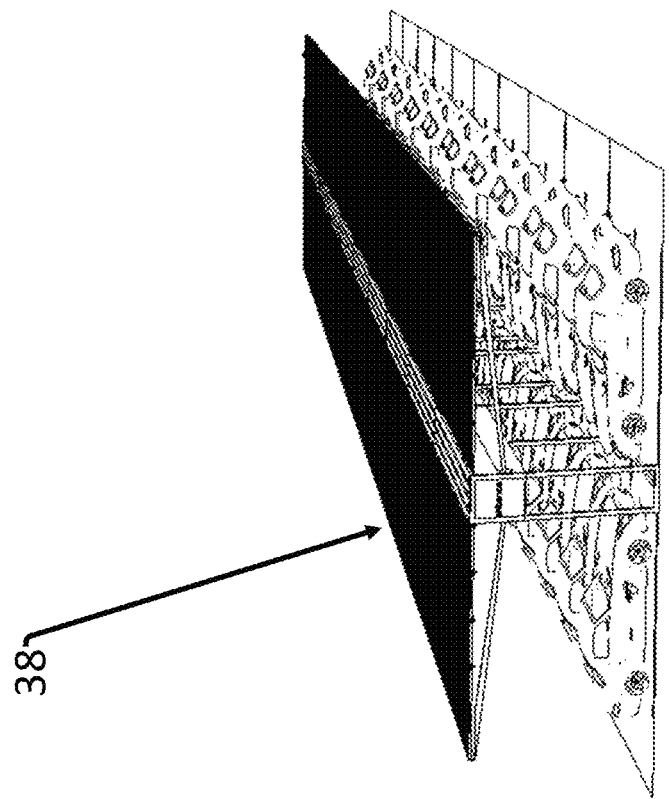
FIG. 13: parking space with several installations.
Figure 14:
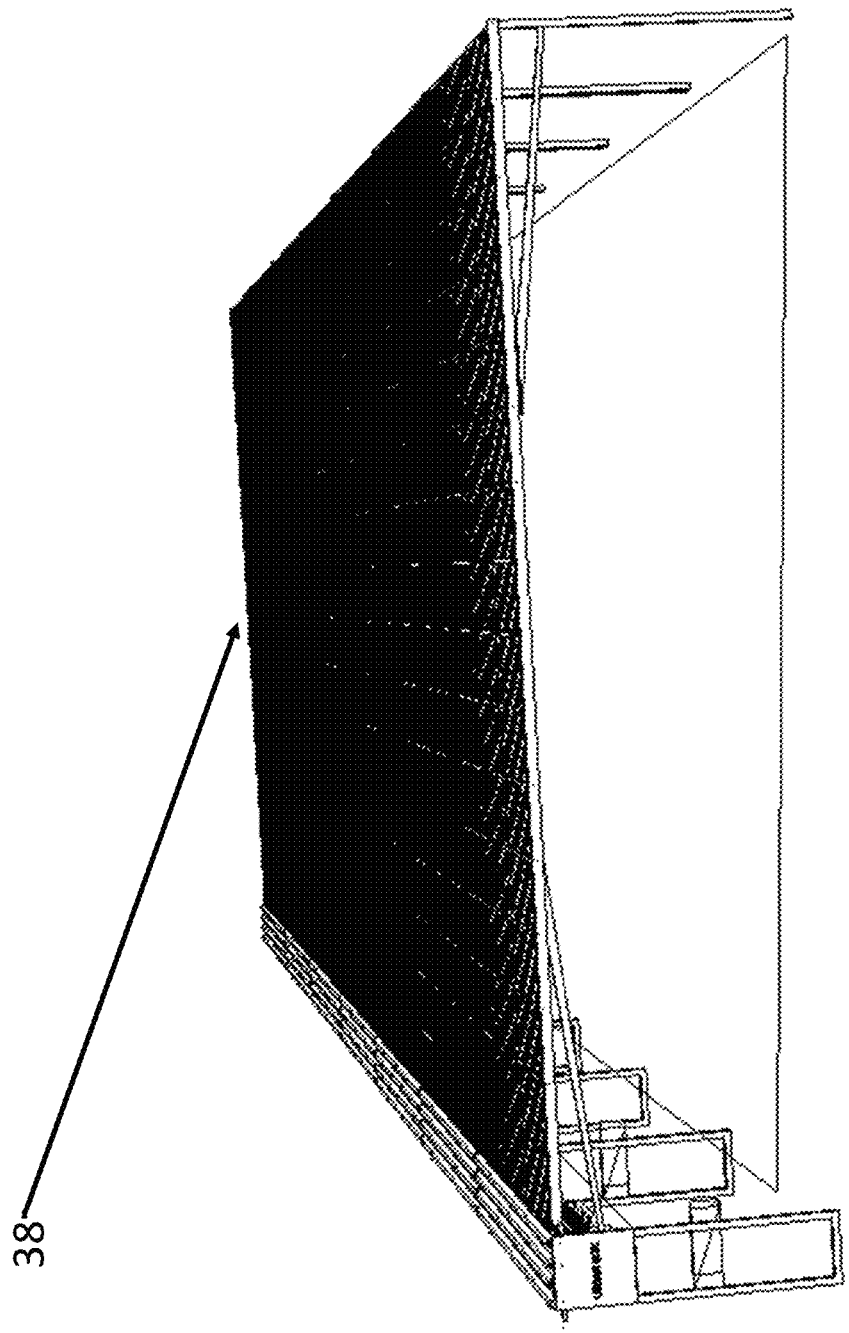
FIG. 14: parking space with variant of the installation that extends on one side.

FIG. 13 shows possible facilities on a larger parking space. FIG. 14 shows a variant with one-sided extension, which is particularly well suited if the parking spaces are facing away from the driveway and there are no further parking spaces on the opposite side, which is the case in many arrangements.

The solar support (38) does not need to be arranged horizontally. It can also be inclined upwards or downwards when viewed from the unit 28. Also, a curved support (for example, arch-like) with corresponding adjustments to the bar 45 (FIG. 3) is possible and allows the efficient overvoltage of large distances, for example over a freeway or a river bed, or other usable areas. Due to the different angles of incident, a maximizer unit is used in each solar module support unit (1) for this arrangement in order to optimize the energy yield.

In addition to the dimensioning, FIG. 11 shows a lighting 150 and a smart cell radio equipment 152, which can also be preassembled on the unit 28 in the factory, if the customer so desires.

Figure 18:
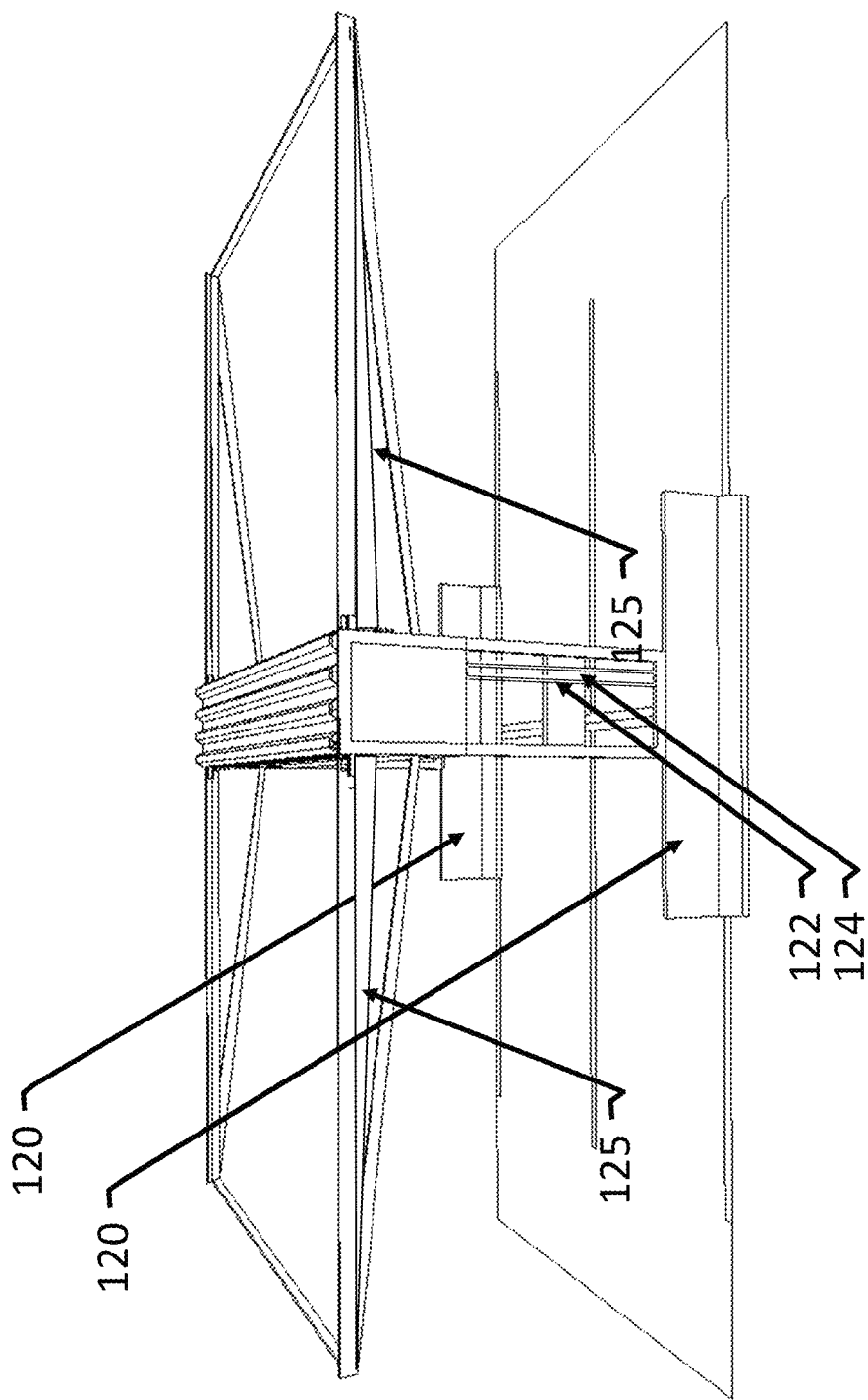
FIG. 18: installation with concrete foundations (jersey type) and means for the supply of electricity and rainwater drainage.

FIG. 18 shows concrete foundations (120), which offer impact protection and can be designed in such a way that no additional anchoring in the ground is necessary. The supply line for electricity 122, the vertical discharge for rainwater 124 and the water collecting device 125 for the lateral absorption of the rainwater are also shown.

FIGS. 19 and 20 show an alternative means which is equipped with a displacement mechanism 142 with drivers 144. Furthermore, the module supports 130, 132, 134 are mounted on a rail 140 and equipped with offset lateral mountings 146, 148, 150 and a mechanical coupling 147, 149. This means has the advantage over the arrangement described above that no vertical lifting means is necessary.

For agricultural crop applications, it makes sense to have an arrangement that ensures additional light transmission for crop plants under the installation. In this case, "dummy units" can be inserted between the module supports 1 and consist at least broadside of two connecting elements 45, which additionally may be connected with longitudinal profiles, such as, e.g., longitudinal profiles 41, 43, to form a frame structure. Also, alternatively, for example, extensions can be attached to the support element 45 with coupling elements 9, 10 at the end of these extensions to establish intermediate distances between the module supports.

The guide profiles 6 of the support structure 2 in this case are proportionally lengthened and, in addition, can be supported with ground supports at certain distances (recommendation, e.g., 10-30 meters).

In addition to the applications described and outlined above, the installation described is also ideally suited for use in terrace shading and/or rain protection with combined power generation. In this case, it makes sense to use customized, narrower module supports configured in length for the object in order to meet customer requirements and aesthetic considerations.

The invention claimed is:

1. A photovoltaic installation, comprising:
a plurality of movable photovoltaic module supports;
a structure for mounting the plurality of photovoltaic module supports in a protection state;
a supporting structure for the plurality of photovoltaic module supports in an extended operating state, the plurality of photovoltaic module supports:
equipped at least on a top thereof with one or more photovoltaic modules that contain solar cells;
stacked one above the other on the structure in the protection state; and
spread out in a planar manner on the supporting structure in the extended operating state;
a transfer mechanism configured to displace each of the plurality of photovoltaic module supports from the protection state laterally away from a stack of the plurality of photovoltaic module supports to the supporting structure, and vice versa, and configured to spread out the plurality of photovoltaic module supports during displacement of individual module supports away from the stack to the supporting structure;
a lifting mechanism configured to:

lift and to lower the stack of the plurality of photovoltaic module supports, and bring one of the plurality of module supports to be transferred in the stack in a transfer plane necessary for the displacement, so that the one of the plurality of module supports can be moved in the extended operating state by the transfer mechanism;
a plurality of couplings attached to the module supports and configured to form a coupling between one of the plurality of module support already extended and the module support to be transferred next on the stack, whereby by a lifting movement of the lifting mechanism, a coupling is formed between the module support already extended and the module support to be transferred next on the stack, the module supports in the extended state being coupled mechanically to each other,
whereby the module supports can be coupled to each other mechanically via one of the plurality of couplings in such a way that the module supports already extended are laterally displaced by displacing an individual module support with the transfer mechanism together with the respective one of the plurality of photovoltaic module supports; and
a controller for controlling the transfer mechanism and the lifting mechanism and for controlling a process flow sequence for extending and retracting the plurality of photovoltaic module supports with the transfer mechanism and the lifting mechanism.

2. The photovoltaic installation of claim 1, wherein the transfer mechanism enables lateral movement in two directions and on both sides of the stack.

3. The photovoltaic installation of claim 1, wherein each of the plurality of couplings is attached laterally on the respective photovoltaic module supports.

4. The photovoltaic installation of claim 1, wherein a next photovoltaic module support in the stack to be transferred is a top most photovoltaic module support in the stack.

5. The photovoltaic installation of claim 1, wherein the supporting structure in a direction of movement of the photovoltaic module support is arranged horizontally, slightly or strongly inclined upwards or downwards, or curved, radially curved, or bent.

6. The photovoltaic installation of claim 1, further comprising a locking mechanism that mechanically secures or clamps the plurality of photovoltaic modules in the stack after the retraction.

7. The photovoltaic installation of claim 1, wherein the supporting structure in the extended operating state is arranged at a height of 2 meters above car parking spaces or pedestrian zones or 4 meters above truck parking spaces or streets.

8. The photovoltaic installation of claim 1, wherein the photovoltaic module supports comprise an additional connection that can be coupled electrically and is coupled both mechanically and electrically during the transfer.

9. The photovoltaic installation of claim 1, further comprising a PV module cleaner that during lateral module transfer cleans the individual photovoltaic module supports with a liquid, air or other medium or by mechanical cleaning.

10. The photovoltaic installation of claim 1, further comprising a collector that collects rain water along a length of the photovoltaic module supports at at least one end thereof and prevents dripping and discharges the collected rain water, the the photovoltaic module supports having an inclination in a direction of the collector.

11. The photovoltaic installation of claim 1, further comprising a plurality of lighting elements located on the plurality of photovoltaic module support structures.

12. The photovoltaic installation of claim 1, further comprising a smart cell or a radio device.

13. The photovoltaic installation of claim 1, further comprising a plurality of floor elements configured to:
allow the structure to be fastened thereto;
serve as an impact protection area; or
enable installation without an anchor or securing mechanism to ground.

14. The photovoltaic installation of claim 1, wherein the plurality of photovoltaic module supports comprise a color design or lighting elements at a bottom thereof.

15. The photovoltaic installation of claim 1, further comprising one or more intermediate elements without solar modules or one or more lateral spacers between the photovoltaic module supports so that, in the extended state, a distance in a range of one or more module widths is formed between each of the photovoltaic module supports.

16. The photovoltaic installation of claim 1, further comprising an overhead unit arranged under the photovoltaic module stack, which contains at least one of an electrical distributor, the controller, solar inverters or electric energy storage.

17. The photovoltaic installation of claim 16, wherein the overhead unit further contains elements of a charging station for electric vehicles for fueling with AC or DC electricity and is provided with a mechanism for lowering an electrical cable from the overhead unit downward and allows further pulling out of the electrical cable by the user for fueling vehicles and for subsequent drawing in of the electrical cable.

18. The photovoltaic installation of claim 1, wherein solar cells of the plurality of photovoltaic modules are selected from crystalline solar cells, bi-facial solar cells, thin film cells, or combinations thereof.

19. The photovoltaic installation of claim 1, wherein the controller is equipped with online access to forecast data including wind speed, wind direction, snowfall, rain, storm, temperature or humidity.

20. The photovoltaic installation of claim 19, wherein the controller can access a local sensor system with current weather data on wind speed, wind direction, snowfall, rain, storm, temperature, humidity or video cameras.

21. The photovoltaic installation of claim 20, wherein the controller is equipped with control software, which, based on the forecast data or the current weather data, decides whether the installation should be in the extended operating state or should be transferred to the protection state.

22. The photovoltaic installation of claim 1, wherein the plurality of photovoltaic module supports is extended into the operating state by operation of the module support arranged on the stack of photovoltaic module supports and is displaced laterally in a transfer plane by one module support width by the transfer mechanism and thereby taken off the stack and placed onto a supporting structure, wherein one or more preceding photovoltaic module supports which lie on the supporting structure and are coupled directly or indirectly with the module support are taken along during displacement, and thereby are also displaced laterally by one module support width, the stack thereafter being lifted by the lifting mechanism until another module support subsequent to the preceding module support reaches the transfer plane and is at the same height as the preceding module support, wherein, upon lifting, the subsequent further module support is coupled mechanically with the preceding module support and thereby is mechanically coupled therewith in the transfer plane, and wherein remaining photovoltaic module supports are subsequently taken from the stack and are spread out in a row in a planar fashion on the supporting structure.

23. The photovoltaic installation of claim 22, wherein the plurality of photovoltaic module supports is retracted into the protection state by operation of the module support being laterally displaced to a stacking installation by one module support width by the transfer mechanism, wherein the plurality of photovoltaic module supports that are coupled directly, or indirectly via one or more photovoltaic module supports in a row, to the first module support, are taken along and also displaced laterally by one module support width, the stack of photovoltaic module supports thereafter grown in the stacking installation being lowered by the lifting mechanism, wherein the module support previously displaced to the stacking installation is taken along, and the coupling to the following support module is released during the lowering, wherein remaining photovoltaic module supports are positioned one on top of the other on the stacking installation in a similar mechanically decoupled fashion until all of the plurality of photovoltaic module supports are retracted.

24. The photovoltaic installation of claim 1, further comprising a charging station.

25. An electric vehicle charging station, comprising:
a photovoltaic installation, comprising:
a plurality of movable photovoltaic module supports;
a structure for mounting the plurality of photovoltaic module supports in a protection state;
a supporting structure for the plurality of photovoltaic module supports in an extended operating state, the plurality of photovoltaic module supports:
equipped at least on a top thereof with one or more photovoltaic modules that contain solar cells;
stacked one above the other on the structure in the protection state; and
spread out in a planar manner on the supporting structure in the extended operating state;
a transfer mechanism configured to displace each of the plurality of photovoltaic module supports from the protection state laterally away from a stack of the plurality of photovoltaic module supports to the supporting structure, and vice versa, and configured to spread out the plurality of photovoltaic module supports during displacement of individual module supports away from the stack to the supporting structure;
a lifting mechanism configured to:
lift and to lower the stack of the plurality of photovoltaic module supports, and bring one of the plurality of module supports to be transferred in the stack in a transfer plane necessary for the displacement, so that the one of the plurality of module supports can be moved in the extended operating state by the transfer mechanism;
a plurality of couplings attached to the module supports and configured to form a coupling between one of the plurality of module support already extended and the module support to be transferred next on the stack, whereby by a lifting movement of the lifting mechanism, a coupling is formed between the module support already extended and the module support to be transferred next on the stack, the module supports in the extended state being coupled mechanically to each other,
whereby the module supports can be coupled to each other mechanically via one of the plurality of couplings in such a way that the module supports already extended are laterally displaced by displacing an individual module support with the transfer mechanism together with the respective one of the plurality of photovoltaic module supports;

a controller for controlling the transfer mechanism and the lifting mechanism and for controlling a process flow sequence for extending and retracting the plurality of photovoltaic module supports with the transfer mechanism and the lifting mechanism; and an overhead unit on the structure, the overhead unit comprising elements of a charging station for the fueling of electric vehicles with AC or DC power.

26. The electric vehicle charging station of claim 24, further comprising an electric charging cable and a mechanism that can lower the electric charging cable.

27. The electric vehicle charging station of claim 25, wherein the mechanism is configured to allow further extension of the electric charging cable for fueling vehicles and to allow subsequent retraction of the electric charging cable.

\* \* \* \* \*